US 12,086,919 B2

(12) United States Patent
Zhang et al.

(10) Patent No.: US 12,086,919 B2
(45) Date of Patent: Sep. 10, 2024

(54) VIDEO PIPELINE

(71) Applicant: Apple Inc., Cupertino, CA (US)

(72) Inventors: Arthur Y Zhang, San Jose, CA (US); Ray L. Chang, Saratoga, CA (US); Timothy R. Oriol, San Jose, CA (US); Ling Su, Los Altos, CA (US); Gurjeet S. Saund, Saratoga, CA (US); Guy Cote, San Jose, CA (US); Jim C. Chou, San Jose, CA (US); Hao Pan, Sunnyvale, CA (US); Tobias Eble, San Francisco, CA (US); Avi Bar-Zeev, Oakland, CA (US); Sheng Zhang, Milpitas, CA (US); Justin A. Hensley, Mountain View, CA (US); Geoffrey Stahl, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/344,294

(22) Filed: Jun. 29, 2023

(65) Prior Publication Data

US 2023/0351672 A1     Nov. 2, 2023

Related U.S. Application Data

(63) Continuation of application No. 17/352,080, filed on Jun. 18, 2021, now Pat. No. 11,727,619, which is a
(Continued)

(51) Int. Cl.
*G06T 15/00* (2011.01)
*G06F 3/01* (2006.01)
(Continued)

(52) U.S. Cl.
CPC ............ *G06T 15/005* (2013.01); *G06F 3/012* (2013.01); *G06T 3/18* (2024.01); *G06T 9/00* (2013.01); *H04W 76/10* (2018.02); *H04W 88/08* (2013.01)

(58) Field of Classification Search
CPC ........ H04W 76/10; H04W 88/08; G06T 3/18; G06T 15/005; G06T 9/00; G06T 19/00;
(Continued)

(56) References Cited

U.S. PATENT DOCUMENTS

| 5,446,501 A | 8/1995 | Takemoto et al. |
| 6,166,748 A | 12/2000 | Van Hook et al. |

(Continued)

FOREIGN PATENT DOCUMENTS

| CN | 101256764 | 9/2008 |
| CN | 103458265 | 12/2013 |

(Continued)

OTHER PUBLICATIONS

Derrick J. Parkhurst, et al., "Variable-Resolution Displays: a Theoretical, Practical and Behavioral Evaluation", Human Factors 44.4, 2002, pp. 611-629.
(Continued)

*Primary Examiner* — Phi Hoang
(74) *Attorney, Agent, or Firm* — Alexander A. Knapp; Kowert, Hood, Munyon, Rankin & Goetzel, P.C.

(57) ABSTRACT

A mixed reality system that includes a device and a base station that communicate via a wireless connection The device may include sensors that collect information about the user's environment and about the user. The information collected by the sensors may be transmitted to the base station via the wireless connection. The base station renders frames or slices based at least in part on the sensor information received from the device, encodes the frames or
(Continued)

slices, and transmits the compressed frames or slices to the device for decoding and display. The base station may provide more computing power than conventional stand-alone systems, and the wireless connection does not tether the device to the base station as in conventional tethered systems. The system may implement methods and apparatus to maintain a target frame rate through the wireless link and to minimize latency in frame rendering, transmittal, and display.

20 Claims, 14 Drawing Sheets

Related U.S. Application Data continuation of application No. 16/662,952, filed on Oct. 24, 2019, now Pat. No. 11,043,018, which is a continuation of application No. PCT/US2018/029862, filed on Apr. 27, 2018.

(60) Provisional application No. 62/492,000, filed on Apr. 28, 2017.

(51) Int. Cl.
*G06T 3/18* (2024.01)
*G06T 9/00* (2006.01)
*H04W 76/10* (2018.01)
*H04W 88/08* (2009.01)

(58) Field of Classification Search
CPC .... G02B 2027/0181; G02B 2027/0138; G02B 2027/014; G02B 27/0093; G02B 2027/0141; G02B 2027/0187; G02B 27/017; H04N 19/162; G06F 1/163; G06F 3/012; G06F 3/013; G06F 3/011
See application file for complete search history.

(56) References Cited

U.S. PATENT DOCUMENTS

| | | | |
|---|---|---|---|
| 6,959,450 B1 | 10/2005 | Ritter et al. | |
| 9,118,932 B2 | 8/2015 | Avadhanam et al. | |
| 9,588,341 B2 | 3/2017 | Bar-Zeev et al. | |
| 9,686,466 B1* | 6/2017 | Billinghurst | H04N 23/635 |
| 9,761,056 B1 | 9/2017 | Gentilin et al. | |
| 10,861,142 B2 | 12/2020 | Jin et al. | |
| 10,979,685 B1 | 4/2021 | Silverstein | |
| 11,043,018 B2 | 6/2021 | Zhang et al. | |
| 11,295,425 B2 | 4/2022 | Jin et al. | |
| 11,330,241 B2 | 5/2022 | Silverstein et al. | |
| 2004/0207632 A1 | 10/2004 | Miller et al. | |
| 2006/0208960 A1 | 9/2006 | Glen | |
| 2007/0172211 A1 | 7/2007 | Panda | |
| 2008/0212888 A1 | 9/2008 | Rai | |
| 2008/0297436 A1 | 12/2008 | Oikawa et al. | |
| 2009/0123066 A1 | 5/2009 | Moriya et al. | |
| 2009/0189981 A1 | 7/2009 | Siann et al. | |
| 2012/0001901 A1 | 1/2012 | Park | |
| 2012/0033893 A1 | 2/2012 | Arakawa | |
| 2012/0249797 A1 | 10/2012 | Haddick et al. | |
| 2012/0250152 A1 | 10/2012 | Larson et al. | |
| 2012/0319928 A1 | 12/2012 | Rhodes | |
| 2013/0088413 A1 | 4/2013 | Raffle et al. | |
| 2014/0139655 A1 | 5/2014 | Mimar | |
| 2014/0184475 A1 | 7/2014 | Tantos et al. | |
| 2014/0247277 A1 | 9/2014 | Guenter et al. | |
| 2014/0253589 A1 | 9/2014 | Tout et al. | |
| 2014/0341293 A1 | 11/2014 | Chen et al. | |
| 2014/0361977 A1 | 12/2014 | Stafford et al. | |
| 2014/0369613 A1 | 12/2014 | Avadhanam et al. | |
| 2015/0003819 A1 | 1/2015 | Ackerman et al. | |
| 2015/0092847 A1 | 4/2015 | Su et al. | |
| 2015/0153572 A1 | 6/2015 | Miao et al. | |
| 2015/0195566 A1 | 7/2015 | Hinz | |
| 2016/0026242 A1 | 1/2016 | Burns et al. | |
| 2016/0155218 A1 | 6/2016 | Svensson et al. | |
| 2016/0227050 A1 | 8/2016 | Nakajima et al. | |
| 2016/0267884 A1 | 9/2016 | Binstock et al. | |
| 2016/0327793 A1 | 11/2016 | Chen et al. | |
| 2016/0343164 A1* | 11/2016 | Urbach | G02B 27/017 |
| 2017/0018688 A1 | 1/2017 | Mazed | |
| 2017/0024861 A1 | 1/2017 | Arata | |
| 2017/0045941 A1* | 2/2017 | Tokubo | A63F 13/213 |
| 2017/0078718 A1 | 3/2017 | Ioffe | |
| 2017/0160798 A1 | 6/2017 | Lanman et al. | |
| 2017/0169602 A1* | 6/2017 | Blackmon | G06T 15/06 |
| 2017/0285736 A1 | 10/2017 | Young et al. | |
| 2017/0287496 A1 | 10/2017 | Heitkamp et al. | |
| 2017/0352187 A1 | 12/2017 | Haines | |
| 2018/0047332 A1 | 2/2018 | Kuwahara et al. | |
| 2018/0096471 A1 | 4/2018 | Wilson et al. | |
| 2018/0114288 A1 | 4/2018 | Aldaz et al. | |
| 2018/0136471 A1* | 5/2018 | Miller | G02B 27/0189 |
| 2018/0268611 A1 | 9/2018 | Nourai et al. | |
| 2018/0286080 A1 | 10/2018 | Marshall et al. | |
| 2018/0357809 A1* | 12/2018 | Lawless | G06T 3/18 |
| 2019/0026874 A1 | 1/2019 | Jin et al. | |
| 2019/0082276 A1 | 3/2019 | Crow et al. | |
| 2019/0158630 A1 | 5/2019 | Aragon et al. | |
| 2019/0272036 A1 | 9/2019 | Grant | |
| 2019/0324478 A1 | 10/2019 | Lin et al. | |
| 2019/0329118 A1 | 10/2019 | Balakrishnan et al. | |
| 2020/0058152 A1 | 2/2020 | Zhang et al. | |
| 2020/0242381 A1 | 7/2020 | Chao | |
| 2020/0327372 A1 | 10/2020 | Anschuetz | |
| 2021/0312694 A1 | 10/2021 | Zhang et al. | |

FOREIGN PATENT DOCUMENTS

| | | |
|---|---|---|
| CN | 104035760 | 9/2014 |
| CN | 104284622 | 1/2015 |
| CN | 104915979 | 9/2015 |
| CN | 204709990 | 10/2015 |
| CN | 105392538 | 3/2016 |
| CN | 106454322 | 2/2017 |
| CN | 106464951 | 2/2017 |
| CN | 106547092 | 3/2017 |
| EP | 1205881 | 5/2002 |
| EP | 2856931 | 4/2015 |
| EP | 3144779 | 3/2017 |
| JP | 2016218341 | 12/2016 |

OTHER PUBLICATIONS

Daniel Pohl, et al., "Improved Pre-Warping for Wide Angle, Head Mounted Displays", Proceedings of the 19th ACM Symposium on Virtual Reality Software and Technology, ACM, 2013, pp. 259-262.
International Preliminary Report of Patentability from PCT/US2018/029862, dated Apr. 28, 2017, (Apple Inc.), pp. 1-10.
Sanghoon Lee, et al., "Foveated Video Compression with Optimal Rate Control," IEEE Transactions on Image Processing, vol. 10, No. 7, Jul. 2001, pp. 977-992.
Evgeny Kuzyakov, "Next-generation video encoding techniques for 360 video and VR", Engineering Blog, Facebook Code, Retrieved from URL: https://code.facebook.com/posts/1126354007399553nextgenerationvideoencodingtechniquesfor360videoandvr/ on Apr. 24, 2017, pp. 1-8.
Zhou Wang et al., "Foveated Image and Video Coding", Chapter 14 in Digital Video Image Quality and Perceptual Coding, Marcel Dekker Series in Signal Processing and Communications, Nov. 2005, pp. 1-29.
International Search Report and Written Opinion from PCT/US2018/043033, Dated Oct. 5, 2018, Apple Inc., pp. 1-16.
International Search Report for Chinese Application No. 201880027784.3, mailed Aug. 23, 2022, Apple Inc, pp. 1-3.
English Translation of International Search Report for Chinese Application No. 201880027784.3, mailed Aug. 23, 2022, Apple Inc, pp. 1-3.

(56) References Cited

OTHER PUBLICATIONS

First Office Action from Chinese Application No. 201880027784.3, mailed Aug. 23, 2022, Apple Inc, pp. 1-10.

* cited by examiner

VIDEO PIPELINE

PRIORITY INFORMATION

This application is a continuation of U.S. patent application Ser. No. 17/352,080, filed Jun. 18, 2021, which is a continuation of U.S. patent application Ser. No. 16/662,952, filed Oct. 24, 2019, now U.S. Pat. No. 11,043,018, which is a continuation of PCT Application Serial No. PCT/US2018/029862, filed Apr. 27, 2018, which claims benefit of priority of U.S. Provisional Application Ser. No. 62/492,000, filed Apr. 28, 2017, the contents of which are incorporated by reference herein in their entirety.

BACKGROUND

Virtual reality (VR) systems display virtual views that provide an immersive virtual environment. Mixed reality (MR) systems combine virtual content with a view of the real world, or add virtual representations of real world objects to a virtual environment. Conventional VR and MR systems are typically either tethered systems including a base station that performs at least some of the rendering of content for display and a device connected to the base station via a physical connection (i.e., a data communications cable), or stand-alone devices that perform rendering of content locally. Stand-alone systems allow users freedom of movement; however, because of restraints including size, weight, batteries, and heat, stand-alone devices are generally limited in terms of computing power and thus limited in the quality of content that can be rendered. The base stations of tethered systems may provide more computing power and thus higher quality rendering than stand-alone devices; however, the physical cable tethers the device to the base station and thus constrains the movements of the user.

SUMMARY

Various embodiments of methods and apparatus for providing mixed reality views to users through wireless connections are described. Embodiments of a mixed reality system are described that may include a device such as a headset, helmet, goggles, or glasses worn by the user, and a separate computing device, referred to herein as a base station. The device and base station may each include wireless communications technology that allows the device and base station to communicate and exchange data via a wireless connection. The device may include world-facing sensors that collect information about the user's environment and user-facing sensors that collect information about the user. The information collected by the sensors may be transmitted to the base station via the wireless connection. The base station may include software and hardware configured to generate and render frames that include virtual content based at least in part on the sensor information received from the device via the wireless connection and to compress and transmit the rendered frames to the device for display via the wireless connection. The base station may provide much more computing power than can be provided by conventional stand-alone systems. In addition, the wireless connection between the device and the base station does not tether the device to the base station as in conventional tethered systems and thus allow users much more freedom of movement than do tethered systems.

Various methods and apparatus are described that may be used to maintain a target frame rate through the wireless link and to minimize latency in frame rendering, transmittal, and display.

A method that may be used in some embodiments may be referred to as warp space rendering. In the warp space rendering method, instead of performing a rectilinear projection which tends to oversample the edges of the image especially in wide FOV frames, a transform is applied that transforms the frame into a warp space. The warp space is then resampled at equal angles. The warp space rendering method resamples the frame so that rendering engine only rasterizes and renders the number of samples it actually needs no matter what direction the user is looking at. The warp space rendering method reduces the resolution of and thus the time it takes to render a frame, which reduces latency, and also reduces the number of bits that need to be transmitted over the wireless link between the device and the base station, which reduces bandwidth usage and latency.

Another method that may be used in some embodiments may be referred to as foveated rendering. In the foveated rendering method, gaze tracking information received from the device may be used to identify the direction in which the user is currently looking. A foveated region may be determined based at least in part on the determined gaze direction. Regions of the frame outside the foveated region (referred to as the peripheral region) may be converted to a lower resolution before transmission to the device, for example by applying a filter (e.g., a band pass filter) to the peripheral region. The foveated rendering method reduces the number of pixels in the rendered frame, which reduces the number of bits that need to be transmitted over the wireless link to the device, which reduces bandwidth usage and latency. In addition, in some embodiments, the peripheral region outside the foveated region of the frames may be transmitted over the wireless link at a lower frame rate than the foveated region.

Another method that may be used in some embodiments may be referred to as foveated compression. In the foveated compressing method, a foveated region and a peripheral region may be determined, either dynamically based on the gaze direction determined from gaze tracking region or statically based on a set system parameter. In some embodiments, the peripheral region may be pre-filtered to reduce information based on knowledge of the human vision system, for example by filtering high frequency information and/or increasing color compression. The amount of filtering applied to the peripheral region may increase extending towards the periphery of the image. Pre-filtering of the peripheral region may result in improved compression of the frame. Alternatively, a higher compression ratio may be used in the peripheral region than a compression ratio that is used in the foveated region.

Another method that may be used in some embodiments may be referred to as dynamic rendering. In the dynamic rendering method, to maintain a target frame rate and latency, a monitoring process on the base station monitors bandwidth on the wireless link and the rate at which the rendering application on the base station is taking to generate frames. Upon detecting that the bandwidth is below a threshold or that the frame rendering rate is below a threshold, the monitoring process may dynamically adjust one or more rendering processes on the base station to reduce the complexity of rendering a frame and thus the resolution of the rendered frames so that a target frame rate and latency to the device can be maintained. The rendering complexity may be adjusted again to increase the complexity of rendering a frame and thus increase the resolution of the frame upon detecting that the monitored metrics have reached or exceeded the threshold.

Instead of or in addition to dynamic rendering, another method that may be used in some embodiments may be referred to as dynamic compression. In the dynamic compression method, to maintain a target frame rate and latency, a monitoring process on the base station monitors bandwidth on the wireless link and the rate at which the rendering application on the base station is taking to generate frames. Upon detecting that the bandwidth is below a threshold or that the frame rendering rate is below a threshold, the monitoring process may dynamically adjust one or more compression processes on the base station to increase the compression ratio and/or increase pre-filtering of the image to reduce high frequency content so that a target frame rate and latency to the device can be maintained. The compression process(es) may be adjusted again to reduce the compression ratio and/or pre-filtering upon detecting that the monitored metrics have reached or exceeded the threshold.

Another method that may be used in some embodiments may be referred to as motion-based rendering. In this method, motion tracking information received from the device may be used to identify motion of the user's head. If the user is not moving their head or not moving it much, frames can be rendered and sent to the device at a lower frame rate. If rapid head motion is detected, the frame rate can be increased.

Another method that may be used some embodiments may be referred to as slice-based rendering. In slice-based rendering, rather than rendering entire frames in the base station and transmitting the rendered frames to the device, the base station may render parts of frames (referred to as slices) and transmit the rendered slices to the device as they are ready. A slice may be one or more lines of a frame, or may be an N×M pixel section or region of a frame. Slice-based rendering reduces latency, and also reduces the amount of memory needed for buffering, which reduces the memory footprint on the chip(s) or processor(s) as well as power requirements.

In addition, methods and apparatus are described that allow the device to function as a stand-alone device as a fallback position if the wireless link with the base station is lost. In addition, methods and apparatus for processing and displaying frames received by the device from the base station via the wireless connection are described, as well as methods and apparatus for replacing incomplete or missing frames with previously received frames.

Figure 1:
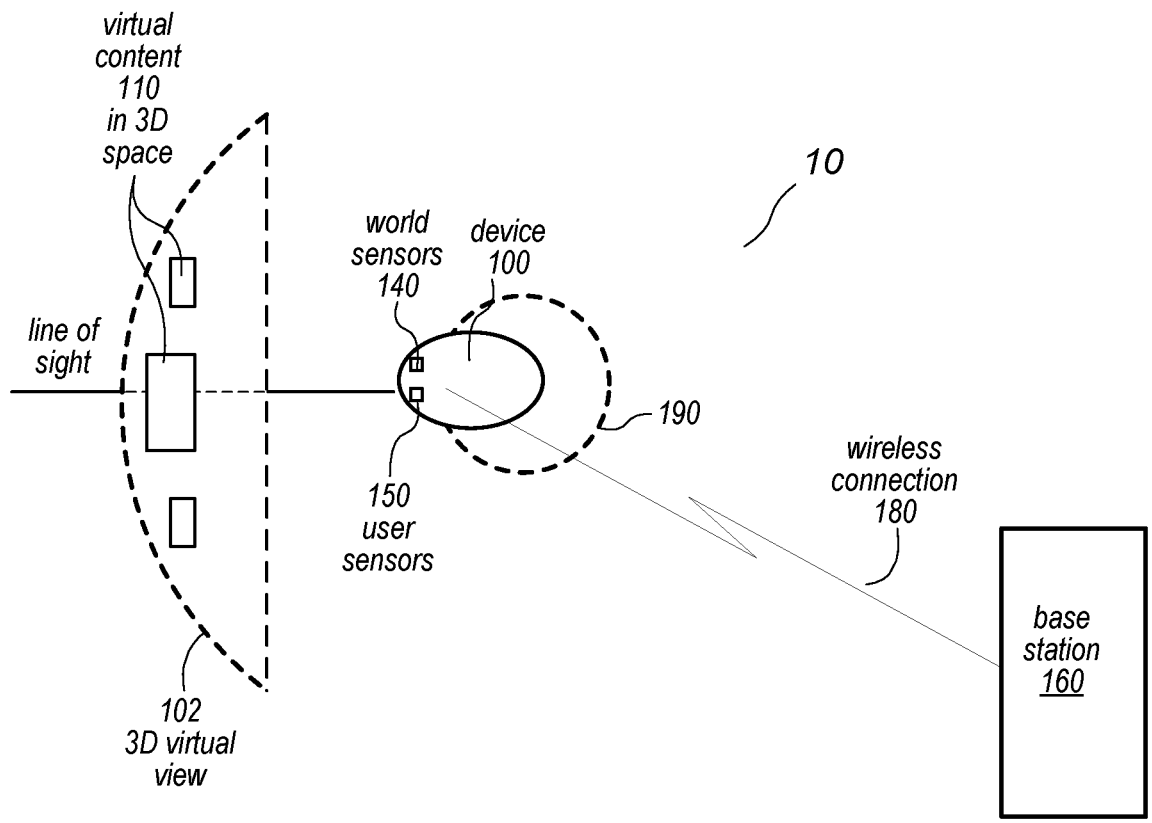
FIG. 1 illustrates a mixed or virtual reality system, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing mixed reality views to users through wireless connections are described. Embodiments of a mixed reality system are described that may include a device such as a headset, helmet, goggles, or glasses worn by the user, and a separate computing device, referred to herein as a base station. The device and base station may each include wireless communications technology that allows the device and base station to communicate and exchange data via a wireless connection. The device may include world-facing sensors that collect information about the user's environment (e.g., video, depth information, lighting information, etc.), and user-facing sensors that collect information about the user (e.g., the user's expressions, eye movement, hand gestures, etc.). The information collected by the sensors may be transmitted to the base station via the wireless connection. The base station may include software and hardware (e.g., processors (system on a chip (SOC), CPUs, image signal processors (ISPs), graphics processing units (GPUs), coder/decoders (codecs), etc.), memory, etc.) configured to generate and render frames that include virtual content based at least in part on the sensor information received from the device via the wireless connection and to compress and transmit the rendered frames to the device for display via the wireless connection.

Embodiments of the mixed reality system as described herein may collect, analyze, transfer, and store personal information, for example images of a person's face and/or of an environment in which the person is using the system. The personal information collected by the sensors should be stored, transferred, and used only by the device and/or by the base station, and used only for the operation of the mixed reality system on the device and the base station. Embodiments will comply with well-established privacy policies and/or privacy practices. In particular, privacy policies and practices that are generally recognized as meeting or exceeding industry or governmental requirements for maintaining personal information private and secure should be implemented. For example, personal information should be collected for legitimate and reasonable uses and not shared or sold outside of those legitimate uses. Further, collection or other uses of the personal information should occur only after receiving the informed consent of the user. Additionally, any needed steps for safeguarding and securing access to such personal information and ensuring that any entity with access to the personal information adhere to the privacy policies and procedures should be taken. Further, any entity with access to the personal information can be subjected to evaluation by third parties to certify adherence to the privacy policies and practices. In addition, in some embodiments, users may selectively block the use of, or access to, their personal information. For example, hardware and/or software elements may be provided that allow a user to selectively prevent or block access to their personal information.

Conventional VR, AR, and MR systems are typically either tethered systems including a base station that performs at least some of the rendering of content for display and a device connected to the base station via a physical connection (i.e., a data communications cable), or stand-alone devices that perform rendering of content locally. Stand-alone systems allow users freedom of movement; however, because of restraints including size, weight, batteries, and heat, stand-alone devices are generally limited in terms of computing power and thus limited in the quality of content that can be rendered. The base stations of tethered systems may provide more computing power and thus higher quality rendering than stand-alone devices; however, the physical cable tethers the device to the base station and thus constrains the movements of the user.

Embodiments of the mixed reality system as described herein include a base station that provides much more computing power than can be provided by conventional stand-alone systems. In addition, the wireless connection between the device and the base station does not tether the device to the base station as in conventional tethered systems and thus allow users much more freedom of movement than do tethered systems.

In some embodiments, the mixed reality system may implement a proprietary wireless communications technology (e.g., 60 gigahertz (GHz) wireless technology) that provides a highly directional wireless link between the device and the base station. In some embodiments, the directionality and bandwidth (e.g., 60 GHZ) of the wireless communication technology may support multiple devices communicating with the base station at the same time to thus enable multiple users to use the system at the same time in a co-located environment. However, other commercial (e.g., Wi-Fi, Bluetooth, etc.) or proprietary wireless communications technologies may be supported in some embodiments.

Two primary constraints to be considered on the wireless link are bandwidth and latency. A target is to provide a high resolution, wide field of view (FOV) virtual display to the user at a frame rate (e.g., 60-120 frames per second (FPS)) that provides the user with a high-quality MR view. Another target is to minimize latency between the time a video frame is captured by the device and the time a rendered MR frame based on the video frame is displayed by the device, for example to the sub-millisecond (ms) range. However, the channel capacity of the wireless link may vary with time, and the wireless link may thus support only a certain amount of information to be transmitted at any given time. Various methods and apparatus are described herein that may be used to maintain the target frame rate through the wireless link and to minimize the latency in frame rendering, transmittal, and display.

A method that may be used in some embodiments may be referred to as warp space rendering, which may be used to reduce the resolution at which frames are rendered by the base station, which reduces computation time, power usage, bandwidth usage, and latency. Ideally, there should be the same resolution on the display in any direction the user is looking. In the warp space rendering method, instead of the rendering engine of the base station performing a rectilinear projection when rendering a frame, which tends to oversample the edges of the image especially in wide FOV frames, a transform is applied that transforms the frame into a warp space. The warp space is then resampled at equal angles. The warp space rendering method resamples the frame so that rendering engine only rasterizes and renders the number of samples it actually needs no matter what direction the user is looking at. The warp space rendering method reduces the resolution of and thus the time it takes to render a frame, which reduces latency, and also reduces the number of bits that need to be transmitted over the wireless link between the device and the base station, which reduces bandwidth usage and latency.

Another method that may be used in some embodiments may be referred to as foveated rendering, which may be used to reduce the resolution of frames rendered by the base station before transmitting the frames to the device, which reduces latency and bandwidth usage. In the foveated rendering method, gaze tracking information received from the device may be used to identify the direction in which the user is currently looking. Human eyes can perceive higher resolution in the foveal region than in the peripheral region. Thus, a region of the frame that corresponds to the fovea (referred to as the foveated region) may be identified based at least in part on the determined gaze direction and transmitted to the device via the wireless connection at a higher resolution, while regions of the frame outside the foveated region (referred to as the peripheral region) may be converted to a lower resolution before transmission to the device, for example by applying a filter (e.g., a band pass filter) to the peripheral region. The foveated rendering method reduces the number of pixels in the rendered frame, which reduces the number of bits that need to be transmitted over the wireless link to the device, which reduces bandwidth usage and latency. In addition, in some embodiments, the peripheral region outside the foveated region of the frames may be transmitted over the wireless link at a lower frame rate than the foveated region.

Another method that may be used in some embodiments may be referred to as foveated compression. In the foveated compressing method, a foveated region and a peripheral region may be determined, either dynamically based on the gaze direction determined from gaze tracking region or statically based on a set system parameter. In some embodiments, the peripheral region may be pre-filtered to reduce information based on knowledge of the human vision system, for example by filtering high frequency information and/or increasing color compression. The amount of filtering applied to the peripheral region may increase extending towards the periphery of the image. Pre-filtering of the peripheral region may result in improved compression of the frame. Alternatively, a higher compression ratio may be used in the peripheral region. A tradeoff between the two methods may be either a blurrier peripheral region (through pre-filtering) or potentially higher compression artifacts (through increasing compression).

Another method that may be used in some embodiments may be referred to as dynamic rendering. In the dynamic rendering method, to maintain a target frame rate and latency, a monitoring process on the base station monitors bandwidth on the wireless link and the rate at which the rendering application on the base station is taking to generate frames. Upon detecting that the bandwidth is below a threshold or that the frame rendering rate is below a threshold, the monitoring process may dynamically adjust one or more rendering processes on the base station to reduce the complexity of rendering a frame and thus the resolution of the rendered frames so that a target frame rate and latency to the device can be maintained. The rendering complexity may be adjusted again to increase the complexity of rendering a frame and thus the resolution of the frame upon detecting that the monitored metrics have reached or exceeded the threshold.

Instead of or in addition to dynamic rendering, another method that may be used in some embodiments may be referred to as dynamic compression. In the dynamic compression method, to maintain a target frame rate and latency a monitoring process on the base station monitors bandwidth on the wireless link and the rate at which the rendering application on the base station is taking to generate frames. Upon detecting that the bandwidth is below a threshold or that the frame rendering rate is below a threshold, the monitoring process may dynamically adjust one or more compression processes on the base station to increase the compression ratio and/or increase pre-filtering of the image to reduce high frequency content so that a target frame rate and latency to the device can be maintained. The compression process(es) may be adjusted again to reduce the compression ratio and/or pre-filtering upon detecting that the monitored metrics have reached or exceeded the threshold.

Another method that may be used in some embodiments may be referred to as motion-based rendering. In this method, motion tracking information received from the device may be used to identify motion of the user's head. If the user is not moving their head or not moving it much, frames can be rendered and sent to the device at a lower frame rate. There may be little or no perceived difference to the user at the lower frame rate because the user's head is not in rapid motion. If rapid head motion is detected, the frame rate can be increased.

Another method that may be used some embodiments may be referred to as slice-based rendering. Rendering and transmitting entire frames may have a latency and memory impact as each frame needs to be completed, stored, and then transmitted to the next stage of the mixed reality system. In slice-based rendering, rather than rendering entire frames in the base station and transmitting the rendered frames to the device, the base station may render parts of frames (referred to as slices) and transmit the rendered slices to the device as they are ready. A slice may be one or more lines of a frame, or may be an N×M pixel section or region of a frame. Slice-based rendering reduces latency, and also reduces the amount of memory needed for buffering, which reduces the memory footprint on the chip(s) or processor(s) as well as power requirements. Note that the term "frame portion" may be used herein to refer to an entire frame or to a slice of a frame as described above.

In addition, methods and apparatus are described that allow the device to function as a stand-alone device as a fallback position if the wireless link with the base station is lost, for example if the base station goes down or an object comes between the device and the base station, blocking the wireless link.

FIG. 1 illustrates a mixed or virtual reality system 10, according to at least some embodiments. In some embodiments, a system 10 may include a device 100, and a base station 160 configured to render mixed reality frames including virtual content 110 for display by the device 100. Device 100 may, for example be a head-mounted device (HMD) such as a headset, helmet, goggles, or glasses that may be worn by a user 190. The mixed reality frames may include computer generated information (referred to as virtual content) composited with real world images or a real world view to augment, or add content to, a user's view of the world, or alternatively may include representations of real world objects composited with views of a computer generated three-dimensional (3D) virtual world. The device 100 and base station 160 may each include wireless communications technology that allows the device 100 and base station 160 to communicate and exchange data via a wireless connection 180.

Figure 2:
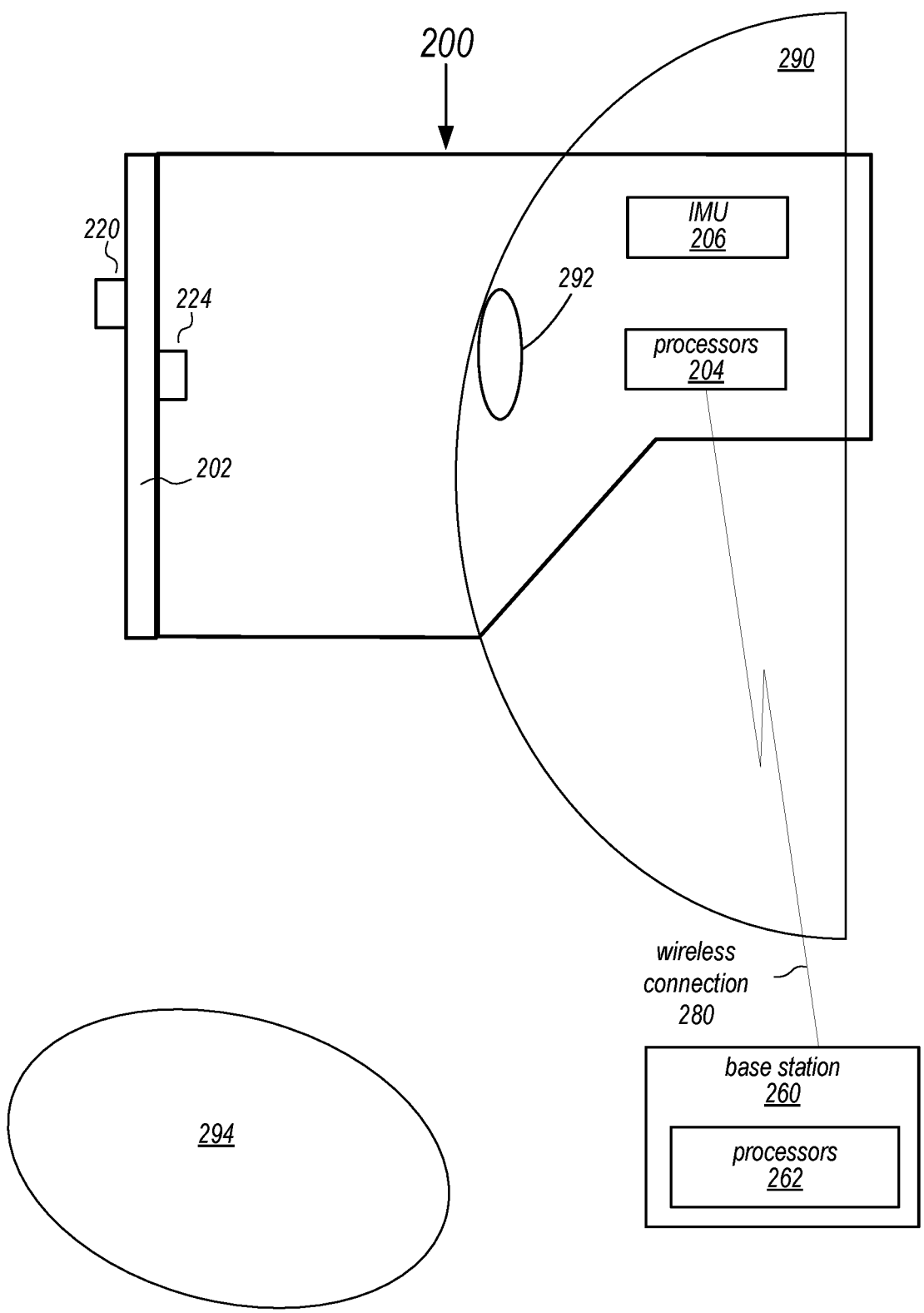
FIG. 2 illustrates sensors of a device in a system as illustrated in FIG. 1, according to at least some embodiments.

The device 100 may include sensors 140 and 150 that collect information about the user 190's environment (video, depth information, lighting information, etc.), and information about the user 190 (e.g., the user's expressions, eye movement, gaze direction, hand gestures, etc.). Example sensors 140 and 150 are shown in FIG. 2. The device 100 may transmit at least some of the information collected by sensors 140 and 150 to a base station 160 of the system 10 via a wireless connection 180. The base station 160 may render frames for display by the device 100 that include virtual content 110 based at least in part on the various information obtained from the sensors 140 and 150, compress the frames, and transmit the frames to the device 100 for display to the user 190 via the wireless connection 180. The information collected by the sensors 140 and 150 should be stored, transferred, and used only by the device 100 and/or by the base station 160, and used only for the operation of the mixed reality system on the device 100 and the base station 160.

A 3D virtual view 102 may be a three-dimensional (3D) space including virtual content 110 at different depths that a user 190 sees when using a mixed or virtual reality system 10. In some embodiments, virtual content 110 may be displayed to the user 190 in the 3D virtual view 102 by the device 100; in the 3D virtual view 102, different virtual objects may be displayed at different depths in a 3D virtual space. In some embodiments, in the 3D virtual view 102, the virtual content 110 may be overlaid on or composited in a view of the user 190's environment with respect to the user's current line of sight that is provided by the device 100. Device 100 may implement any of various types of virtual reality projection technologies. For example, device 100 may be a near-eye VR system that displays left and right images on screens in front of the user 190's eyes that are viewed by a subject, such as DLP (digital light processing), LCD (liquid crystal display) and LCOS (liquid crystal on silicon) technology VR systems. In some embodiments, the screens may be see-through displays. As another example, device 100 may be a direct retinal projector system that scans left and right images, pixel by pixel, to the subject's eyes. To scan the images, left and right projectors generate beams that are directed to left and right reflective components (e.g., ellipsoid mirrors) located in front of the user 190's eyes; the reflective components reflect the beams to the user's eyes. To create a three-dimensional (3D) effect, virtual content 110 at different depths or distances in the 3D virtual view 102 are shifted left or right in the two images as a function of the triangulation of distance, with nearer objects shifted more than more distant objects.

While not shown in FIG. 1, in some embodiments the mixed reality system 10 may include one or more other components. For example, the system may include a cursor control device (e.g., mouse) for moving a virtual cursor in the 3D virtual view 102 to interact with virtual content 110.

While FIG. 1 shows a single user 190 and device 100, in some embodiments the mixed reality system 10 may support multiple devices 100 communicating with the base station 160 at the same time to thus enable multiple users 190 to use the system at the same time in a co-located environment.

FIG. 2 illustrates sensors of an example device 200, according to at least some embodiments. FIG. 2 shows a side view of an example device 200 with sensors, according to some embodiments. Note that device 200 as illustrated in FIG. 2 is given by way of example, and is not intended to be limiting. In various embodiments, the shape, size, and other features of the device may differ, and the locations, numbers, types, and other features of the world and user sensors may vary. The device 200 may, for example, be a head-mounted device (HMD) such as a headset, helmet, goggles, or glasses worn by the user.

The device 200 may include sensors that collect information about the user 290's environment (video, depth information, lighting information, etc.) and information about the user 290 (e.g., the user's expressions, eye movement, hand gestures, etc.). In some embodiments, the device 200 may be worn by a user 290's so that the projection system displays 202 (e.g. screens and optics of a near-eye VR system, or reflective components (e.g., ellipsoid mirrors) of a direct retinal projector system) are disposed in front of the user 290's eyes 292.

The device 200 may include one or more of various types of processors 204 (system on a chip (SOC), CPUs, image signal processors (ISPs), graphics processing units (GPUs), coder/decoders (codecs), etc.) that may, for example perform initial processing (e.g., compression) of the information collected by the sensors and transmit the information to a base station 260 of the mixed reality system via a wireless connection 280, and that may also perform processing (e.g., decoding/decompression) of compressed frames received from the base station 260 and provide the processed frames to the display subsystem for display. In some embodiments, virtual content may be displayed to the user 290 in a 3D virtual view by the device 200; in the 3D virtual view, different virtual objects may be displayed at different depths in a 3D virtual space. In some embodiments, in the 3D virtual view, the virtual content may be overlaid on or composited in a view of the user 290's environment with respect to the user's current line of sight that is provided by the device 200.

In some embodiments, the wireless connection 280 may be implemented according to a proprietary wireless communications technology (e.g., 60 gigahertz (GHz) wireless technology) that provides a highly directional wireless link between the device 200 and the base station 260. However, other commercial (e.g., Wi-Fi, Bluetooth, etc.) or proprietary wireless communications technologies may be used in some embodiments.

Figure 3:
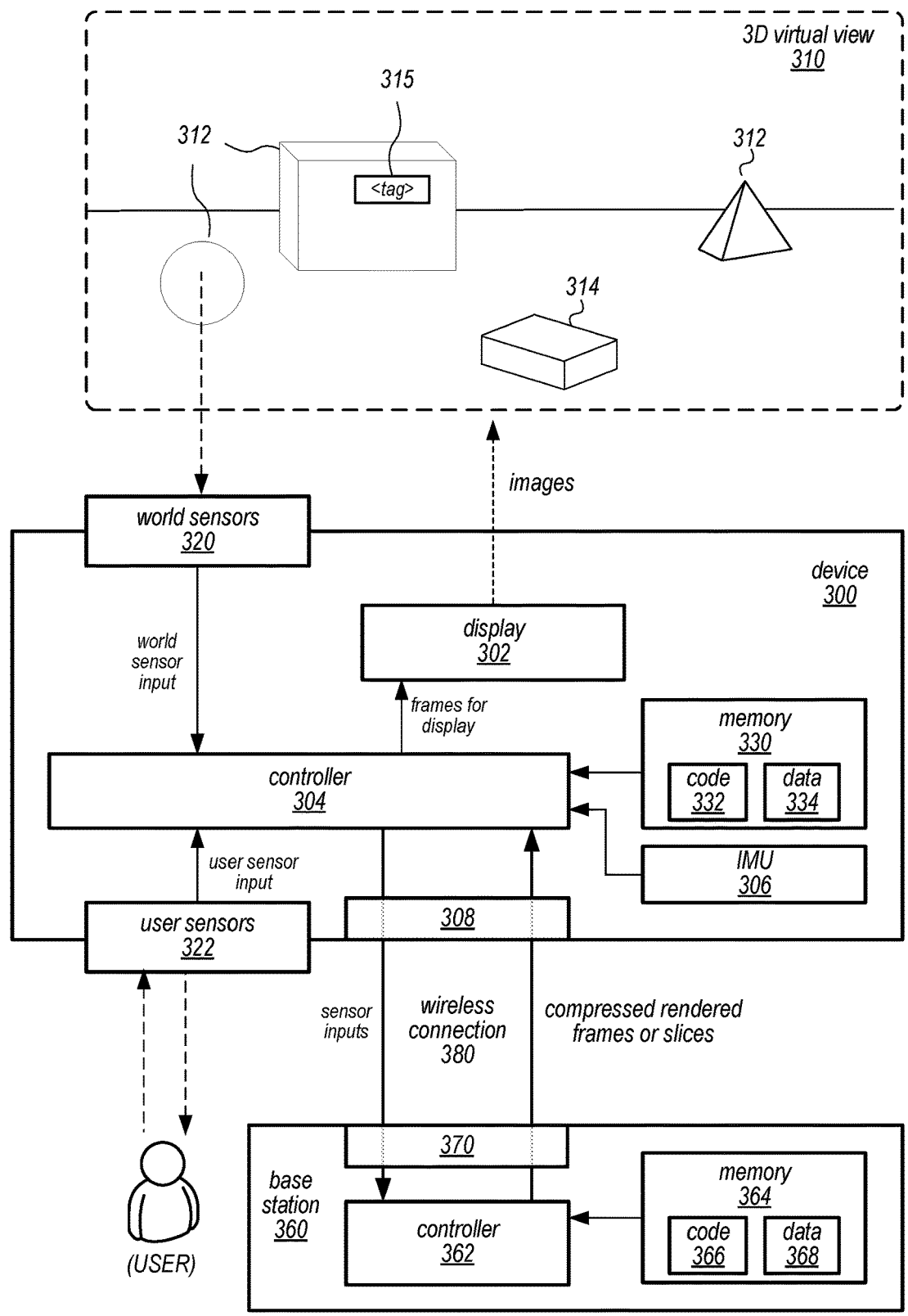
FIG. 3 is a block diagram illustrating components of a mixed reality system as illustrated in FIG. 1, according to at least some embodiments.
Figure 12:
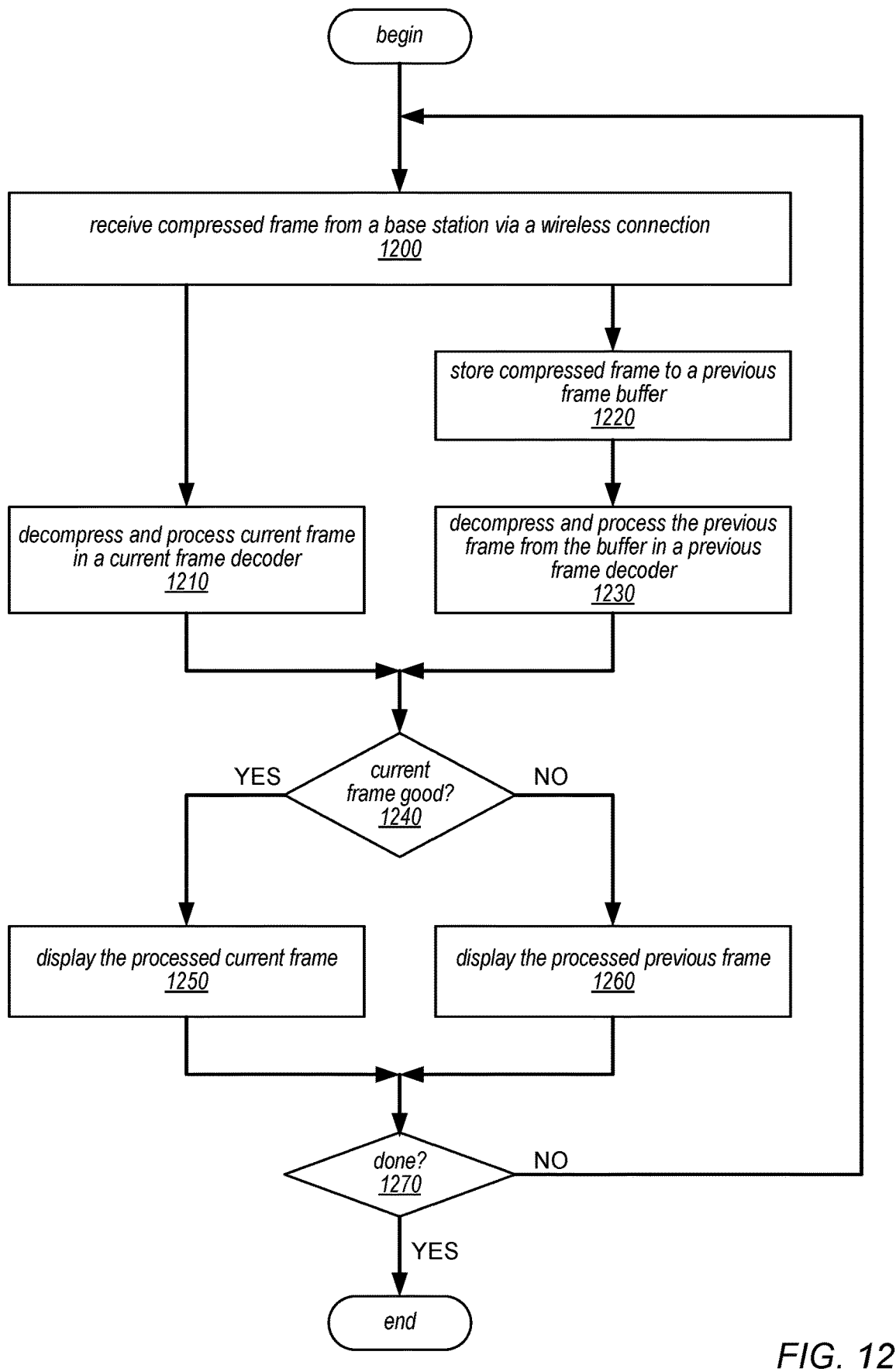
FIG. 12 is a flowchart of a method for processing and displaying frames received by the device from the base station via the wireless connection, according to some embodiments.

The base station 260 may be an external device (e.g., a computing system, game console, etc.) that is communicatively coupled to device 200 via a wireless interface. The base station 260 may include one or more of various types of processors 262 (e.g., SOCs, CPUs, ISPs, GPUS, codecs, and/or other components for processing and rendering video and/or images). The base station 260 may render frames (each frame including a left and right image) that include virtual content based at least in part on the various inputs obtained from the sensors via the wireless connection 280, compress the rendered frames, and transmit the compressed frames to the device 200 for display to the left and right displays 202. FIGS. 3 and 12 further illustrate components and operations of a device 200 and base station 260 of a mixed reality system, according to some embodiments.

Device sensors may, for example, be located on external and internal surfaces of a device 200, and may collect various information about the user 290 and about the user's environment. In some embodiments, the information collected by the sensors may be used to provide the user with a virtual view of their real environment. The information collected by the sensors should be stored, transferred, and used only by the device 200 and/or by the base station 260, and used only for the operation of the mixed reality system on the device 200 and the base station 260. In some embodiments, the sensors may be used to provide depth information for objects in the real environment. In some embodiments, the sensors may be used to provide orientation and motion information for the user in the real environment. In some embodiments, the sensors may be used to collect color and lighting information in the real environment. In some embodiments, the information collected by the sensors may be used to adjust the rendering of images to be projected, and/or to adjust the projection of the images by the projection system of the device 200. In some embodiments, the information collected by the sensors may be used in generating an avatar of the user 290 in the 3D virtual view projected to the user by the device 200. In some embodiments, the information collected by the sensors may be used in interacting with or manipulating virtual content in the 3D virtual view projected by the device 200. In some embodiments, the user information collected by one or more user-facing sensors may be used to adjust the collection of, and/or processing of information collected by one or more world-facing sensors.

In some embodiments, the sensors may include one or more scene cameras 220 (e.g., RGB (visible light) video cameras) that capture high-quality video of the user's environment that may be used to provide the user 290 with a virtual view of their real environment. In some embodiments, video streams captured by cameras 220 may be compressed by the device 200 and transmitted to the base station 260 via wireless connection 280. The frames may be decompressed and processed by the base station 260 at least in part according to other sensor information received from the device 200 via the wireless connection 280 to render frames including virtual content; the rendered frames may then be compressed and transmitted to the device 200 via the wireless connection 280 for display to the user 290.

In some embodiments, if the wireless connection 280 to the base station 200 is lost for some reason, at least some video frames captured by cameras 200 may be processed by processors 204 of device 200 to provide a virtual view of the real environment to the user 290 via display 202. This may, for example, be done for safety reasons so that the user 290 can still view the real environment that they are in even if the base station 260 is unavailable. In some embodiments, the processors 204 may render virtual content to be displayed in the virtual view, for example a message informing the user 290 that the wireless connection 280 has been lost.

In an example non-limiting embodiment, scene cameras 220 may include high quality, high resolution RGB video cameras, for example 10 megapixel (e.g., 3072×3072 pixel count) cameras with a frame rate of 60 frames per second (FPS) or greater, horizontal field of view (HFOV) of greater than 90 degrees, and with a working distance of 0.1 meters (m) to infinity. In some embodiments there may be two scene cameras 220 (e.g., a left and a right camera 220) located on a front surface of the device 200 at positions that are substantially in front of each of the user 290's eyes 292. However, more or fewer scene cameras 220 may be used in a device 200 to capture video of the user 290's environment, and scene cameras 220 may be positioned at other locations.

In some embodiments, the sensors may include one or more world mapping sensors (e.g., infrared (IR) cameras with an IR illumination source, or Light Detection and Ranging (LIDAR) emitters and receivers/detectors) that, for example, capture depth or range information for objects and surfaces in the user's environment. The range information may, for example, be used in positioning virtual content composited with images of the real environment at correct depths. In some embodiments, the range information may be used in adjusting the depth of real objects in the environment when displayed; for example, nearby objects may be re-rendered to be smaller in the display to help the user in avoiding the objects when moving about in the environment. In some embodiments there may be one world mapping sensor located on a front surface of the device 200. However, in various embodiments, more than one world mapping sensor may be used, and world mapping sensor(s) may be positioned at other locations. In an example non-limiting embodiment, a world mapping sensor may include an IR light source and IR camera, for example a 1 megapixel (e.g., 1000×1000 pixel count) camera with a frame rate of 60 frames per second (FPS) or greater, HFOV of 90 degrees or greater, and with a working distance of 0.1 m to 1.5 m.

In some embodiments, the sensors may include one or more head pose sensors (e.g., IR or RGB cameras) that may capture information about the position, orientation, and/or motion of the user and/or the user's head in the environment. The information collected by head pose sensors may, for example, be used to augment information collected by an inertial-measurement unit (IMU) 206 of the device 200. The augmented position, orientation, and/or motion information may be used in determining how to render and display virtual views of the user's environment and virtual content within the views. For example, different views of the environment may be rendered based at least in part on the position or orientation of the user's head, whether the user is currently walking through the environment, and so on. As another example, the augmented position, orientation, and/ or motion information may be used to composite virtual content with the scene in a fixed position relative to the background view of the user's environment. In some embodiments there may be two head pose sensors located on a front or top surface of the device 200. However, in various embodiments, more or fewer head pose sensors may be used, and the sensors may be positioned at other locations. In an example non-limiting embodiment, head pose sensors may include RGB or IR cameras, for example 400×400 pixel count cameras, with a frame rate of 120 frames per second (FPS) or greater, wide field of view (FOV), and with a working distance of 1 m to infinity. The head pose sensors may include wide FOV lenses, and may look in different directions. The head pose sensors may provide low latency monochrome imaging for tracking head position and motion, and may be integrated with an IMU of the device 200 to augment head position and movement information captured by the IMU.

In some embodiments, the sensors may include one or more light sensors (e.g., RGB cameras) that capture lighting information (e.g., direction, color, and intensity) in the user's environment that may, for example, be used in rendering virtual content in the virtual view of the user's environment, for example in determining coloring, lighting, shadow effects, etc. for virtual objects in the virtual view. For example, if a red light source is detected, virtual content rendered into the scene may be illuminated with red light, and more generally virtual objects may be rendered with light of a correct color and intensity from a correct direction and angle. In some embodiments there may be one light sensor located on a front or top surface of the device 200. However, in various embodiments, more than one light sensor may be used, and light sensor(s) may be positioned at other locations. In an example non-limiting embodiment, a light sensor may include an RGB high dynamic range (HDR) video camera, for example a 500×500 pixel count camera, with a frame rate of 30 FPS, HFOV of 180 degrees or greater, and with a working distance of 1 m to infinity.

In some embodiments, the sensors may include one or more gaze tracking sensors 224 (e.g., IR cameras with an IR illumination source) that may be used to track position and movement of the user's eyes. In some embodiments, gaze tracking sensors 224 may also be used to track dilation of the user's pupils. In some embodiments, there may be two gaze tracking sensors 224, with each gaze tracking sensor tracking a respective eye 292. In some embodiments, the information collected by the gaze tracking sensors 224 may be used to adjust the rendering of images to be projected, and/or to adjust the projection of the images by the projection system of the device 200, based on the direction and angle at which the user's eyes are looking. For example, in some embodiments, content of the images in a region around the location at which the user's eyes are currently looking may be rendered with more detail and at a higher resolution than content in regions at which the user is not looking, which allows available processing time for image data to be spent on content viewed by the foveal regions of the eyes rather than on content viewed by the peripheral regions of the eyes. Similarly, content of images in regions at which the user is not looking may be compressed more than content of the region around the point at which the user is currently looking. In some embodiments, the information collected by the gaze tracking sensors 224 may be used to match direction of the eyes of an avatar of the user 290 to the direction of the user's eyes. In some embodiments, brightness of the projected images may be modulated based on the user's pupil dilation as determined by the gaze tracking sensors 224. In some embodiments there may be two gaze tracking sensors 224 located on an inner surface of the device 200 at positions such that the sensors 224 have views of respective ones of the user 290's eyes 292. However, in various embodiments, more or fewer gaze tracking sensors 224 may be used in a device 200, and sensors 224 may be positioned at other locations. In an example non-limiting embodiment, each gaze tracking sensor 224 may include an IR light source and IR camera, for example a 400×400 pixel count camera with a frame rate of 120 FPS or greater, HFOV of 70 degrees, and with a working distance of 10 millimeters (mm) to 80 mm.

In some embodiments, the sensors may include one or more sensors (e.g., IR cameras with IR illumination) that track expressions of the user's forehead area and/or of the user's mouth/jaw area. In some embodiments, expressions of the brow, mouth, jaw, and eyes captured by the user-facing sensors may be used to simulate expressions on an avatar in the virtual space, and/or to selectively render and composite virtual content based at least in part on the user's reactions to projected content. In some embodiments there may be two sensors located on an inner surface of the device 200 at positions such that the sensors have views of the user 290's forehead, and two sensors located on an inner surface of the device 200 at positions such that the sensors have views of the user 290's lower jaw and mouth. However, in various embodiments, more or fewer sensors may be used in a device 200, and the sensors may be positioned at other locations than those shown. In an example non-limiting embodiment, each sensor may include an IR light source and IR camera. In some embodiments, images from two or more of the sensors may be combined to form a stereo view of a portion of the user's faces.

In some embodiments, the sensors may include one or more sensors (e.g., IR cameras with IR illumination) that track position, movement, and gestures of the user's hands, fingers, and/or arms. As an example, the user's detected hand and finger gestures may be used to determine interactions of the user with virtual content in the virtual space, including but not limited to gestures that manipulate virtual objects, gestures that interact with virtual user interface elements displayed in the virtual space, etc. In some embodiments there may be one sensor located on a bottom surface of the device 200. However, in various embodiments, more than one sensor may be used, and sensors may be positioned at other locations. In an example non-limiting embodiment, a sensor may include an IR light source and IR camera.

FIG. 3 is a block diagram illustrating components of an example mixed reality system, according to at least some embodiments. In some embodiments, a mixed reality system may include a device 300 and a base station 360 (e.g., a computing system, game console, etc.). The device 300 may, for example, be a head-mounted device (HMD) such as a headset, helmet, goggles, or glasses worn by the user.

Device 300 may include a display 302 component or subsystem that may implement any of various types of virtual reality projector technologies. For example, the device 300 may include a near-eye VR projector that displays frames including left and right images on screens that are viewed by a user, such as DLP (digital light processing), LCD (liquid crystal display) and LCoS (liquid crystal on silicon) technology projectors. In some embodiments, the screens may be sec-through displays. As another example, the device 300 may include a direct retinal projector that scans frames including left and right images, pixel by pixel, directly to the user's eyes via a reflective surface (e.g., reflective eyeglass lenses). To create a three-dimensional (3D) effect in 3D virtual view 310, objects at different depths or distances in the two images are shifted left or right as a function of the triangulation of distance, with nearer objects shifted more than more distant objects.

The device 300 may also include a controller 304 configured to implement device-side functionality of the mixed reality system as described herein. In some embodiments, device 300 may also include a memory 330 configured to store software (code 332) of the device component of the mixed reality system that is executable by the controller 304, as well as data 334 that may be used by the code 332 when executing on the controller 304.

In various embodiments, controller 304 may be a uniprocessor system including one processor, or a multiprocessor system including several processors (e.g., two, four, eight, or another suitable number). Controller 304 may include central processing units (CPUs) configured to implement any suitable instruction set architecture, and may be configured to execute instructions defined in that instruction set architecture. For example, in various embodiments controller 304 may include general-purpose or embedded processors implementing any of a variety of instruction set architectures (ISAs), such as the x86, PowerPC, SPARC, RISC, or MIPS ISAS, or any other suitable ISA. In multiprocessor systems, each of the processors may commonly, but not necessarily, implement the same ISA. Controller 304 may employ any microarchitecture, including scalar, superscalar, pipelined, superpipelined, out of order, in order, speculative, non-speculative, etc., or combinations thereof. Controller 304 may include circuitry to implement microcoding techniques. Controller 304 may include one or more processing cores each configured to execute instructions. Controller 304 may include one or more levels of caches, which may employ any size and any configuration (set associative, direct mapped, etc.).

In some embodiments, controller 304 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 304 may include one or more other components for processing and rendering video and/or images, for example image signal processors (ISPs), coder/decoders (codecs), etc. In some embodiments, controller 304 may include at least one system on a chip (SOC).

Memory 330 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc., or memory modules such as single inline memory modules (SIMMs), dual inline memory modules (DIMMs), etc. In some embodiments, memory devices may be mounted with an integrated circuit implementing system in a chip-on-chip configuration, a package-on-package configuration, or a multi-chip module configuration.

In some embodiments, the device 300 may include sensors of various types. In some embodiments, the device 300 may include at least one inertial-measurement unit (IMU) 306 configured to detect position, orientation, and/or motion of the device 300, and to provide the detected position, orientation, and/or motion data to the controller 304 of the device 300. In some embodiments, the device 300 may include sensors 320 and 322 that collect information about the user's environment (video, depth information, lighting information, etc.) and about the user (e.g., the user's expressions, eye movement, hand gestures, etc.). The sensors 320 and 322 may provide the collected information to the controller 304 of the device 300. Sensors 320 and 322 may include, but are not limited to, visible light cameras (e.g., video cameras), infrared (IR) cameras, IR cameras with an IR illumination source, Light Detection and Ranging (LIDAR) emitters and receivers/detectors, and laser-based sensors with laser emitters and receivers/detectors. Sensors of an example device are shown in FIG. 2.

The device 300 may also include one or more wireless technology interfaces 308 configured to communicate with an external base station 360 via a wireless connection 380 to send sensor inputs to the base station 360 and receive compressed rendered frames or slices from the base station 360. In some embodiments, a wireless technology interface 308 may implement a proprietary wireless communications technology (e.g., 60 gigahertz (GHz) wireless technology) that provides a highly directional wireless link between the device 300 and the base station 360. However, other commercial (e.g., Wi-Fi, Bluetooth, etc.) or proprietary wireless communications technologies may be used in some embodiments.

Base station 360 may be or may include any type of computing system or computing device, such as a desktop computer, notebook or laptop computer, pad or tablet device, smartphone, hand-held computing device, game controller, game system, and so on. Base station 360 may include a controller 362 comprising one or more processors configured to implement base-side functionality of the mixed reality system as described herein. Base station 360 may also include a memory 364 configured to store software (code 366) of the base station component of the mixed reality system that is executable by the controller 362, as well as data 368 that may be used by the code 366 when executing on the controller 362.

In various embodiments, controller 362 may be a uniprocessor system including one processor, or a multiprocessor system including several processors (e.g., two, four, eight, or another suitable number). Controller 362 may include central processing units (CPUs) configured to implement any suitable instruction set architecture, and may be configured to execute instructions defined in that instruction set architecture. For example, in various embodiments controller 362 may include general-purpose or embedded processors implementing any of a variety of instruction set architectures (ISAs), such as the x86, PowerPC, SPARC, RISC, or MIPS ISAS, or any other suitable ISA. In multiprocessor systems, each of the processors may commonly, but not necessarily, implement the same ISA. Controller 362 may employ any microarchitecture, including scalar, superscalar, pipelined, superpipelined, out of order, in order, speculative, non-speculative, etc., or combinations thereof. Controller 362 may include circuitry to implement microcoding techniques. Controller 362 may include one or more processing cores each configured to execute instructions. Controller 362 may include one or more levels of caches, which may employ any size and any configuration (set associative, direct mapped, etc.).

In some embodiments, controller 362 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 362 may include one or more other components for processing and rendering video and/or images, for example image signal processors (ISPs), coder/decoders (codecs), etc. In some embodiments, controller 362 may include at least one system on a chip (SOC).

Memory 364 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc., or memory modules such as single inline memory modules (SIMMs), dual inline memory modules (DIMMs), etc. In some embodiments, memory devices may be mounted with an integrated circuit implementing system in a chip-on-chip configuration, a package-on-package configuration, or a multi-chip module configuration.

Base station 360 may also include one or more wireless technology interfaces 370 configured to communicate with device 300 via a wireless connection 380 to receive sensor inputs from the device 300 and send compressed rendered frames or slices from the base station 360 to the device 300. In some embodiments, a wireless technology interface 370 may implement a proprietary wireless communications technology (e.g., 60 gigahertz (GHz) wireless technology) that provides a highly directional wireless link between the device 300 and the base station 360. In some embodiments, the directionality and band width (e.g., 60 GHZ) of the wireless communication technology may support multiple devices 300 communicating with the base station 360 at the same time to thus enable multiple users to use the system at the same time in a co-located environment. However, other commercial (e.g., Wi-Fi, Bluetooth, etc.) or proprietary wireless communications technologies may be used in some embodiments.

Figure 4:
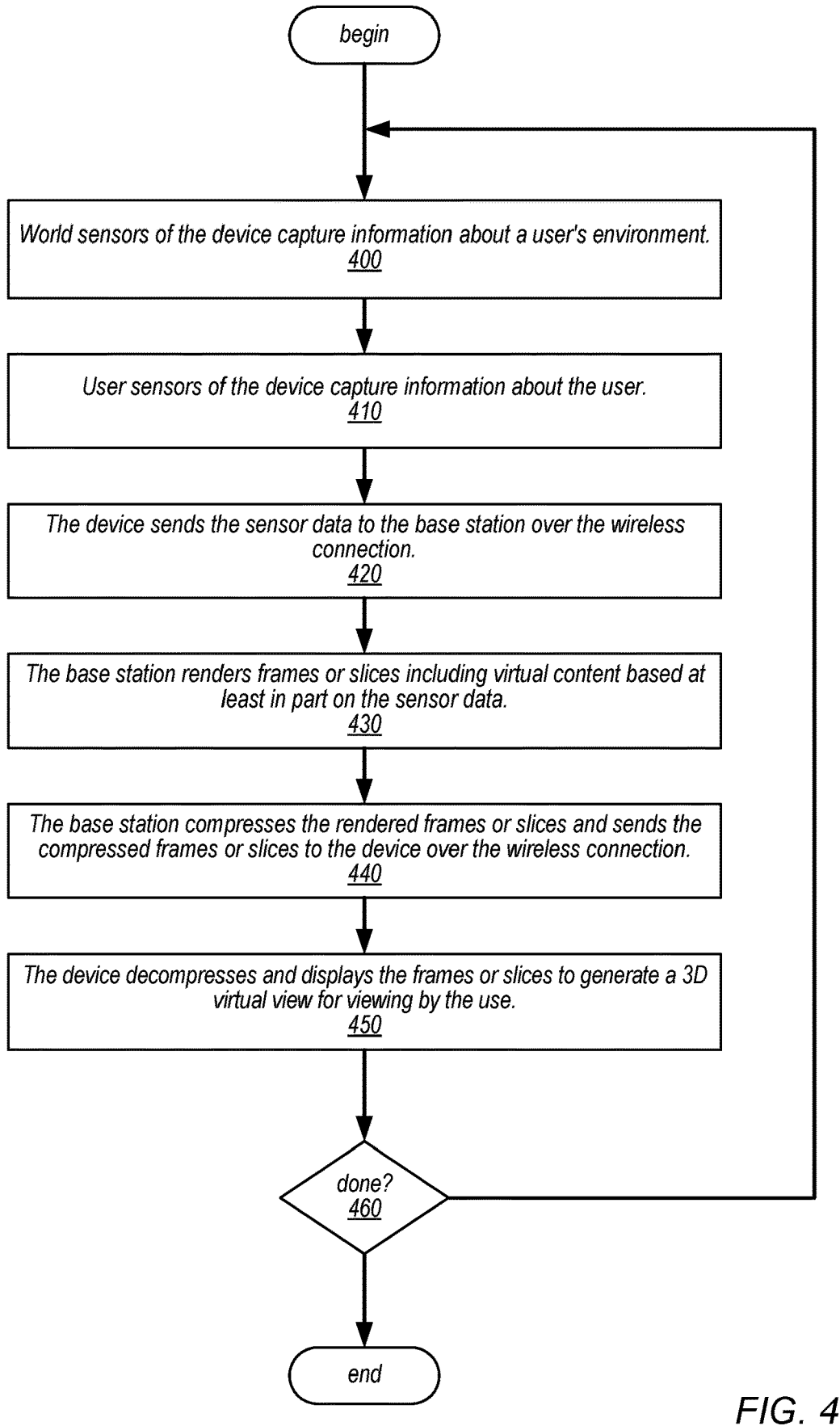
FIG. 4 is a high-level flowchart of a method of operation for a mixed reality system as illustrated in FIGS. 1 through 3, according to at least some embodiments.

The base station 360 may be configured to render and transmit frames to the device 300 to provide a 3D virtual view 310 for the user based at least in part on world sensor 320 and user sensor 322 inputs received from the device 300. The virtual view 310 may include renderings of the user's environment, including renderings of real objects 312 in the user's environment, based on video captured by one or more scene cameras (e.g., RGB (visible light) video cameras) that capture high-quality, high-resolution video of the user's environment in real time for display. The virtual view 310 may also include virtual content (e.g., virtual objects, 314, virtual tags 315 for real objects 312, avatars of the user, etc.) rendered and composited with the projected 3D view of the user's real environment by the base station 360. FIG. 4 describes an example method for collecting and processing sensor inputs to generate content in a 3D virtual view 310 that may be used in a mixed reality system as illustrated in FIG. 3, according to some embodiments.

FIG. 4 is a high-level flowchart of a method of operation for a mixed reality system as illustrated in FIGS. 1 through 3, according to at least some embodiments. The mixed reality system may include a device such as a headset, helmet, goggles, or glasses that includes a display component for displaying frames including left and right images to a user's eyes to thus provide 3D virtual views to the user. The 3D virtual views may include views of the user's environment augmented with virtual content (e.g., virtual objects, virtual tags, etc.). The mixed reality system may also include a base station configured to receive sensor inputs, including frames captured by cameras on the device as well as eye and motion tracking inputs, from the device via a wireless interface, render mixed reality frames at least in part according to the sensor inputs, compress the mixed reality frames, and transmit the compressed frames to the device via the wireless interface for display.

As indicated at 400, one or more world sensors on the device may capture information about the user's environment (e.g., video, depth information, lighting information, etc.), and provide the information as inputs to a controller of the device. As indicated at 410, one or more user sensors on the device may capture information about the user (e.g., the user's expressions, eye movement, hand gestures, etc.), and provide the information as inputs to the controller of the device. Elements 410 and 420 may be performed in parallel, and may be performed continuously to provide sensor inputs as the user uses the mixed reality system. As indicated at 420, the device sends at least some of the sensor data to the base station over the wireless connection. In some embodiments, the controller of the device may perform some processing of the sensor data, for example compression, before transmitting the sensor data to the base station. As indicated at 430, the controller of the base station may render frame portions (a frame portion may include an entire frame or a slice of a frame) including virtual content based at least in part on the inputs from the world and user sensors received from the device via the wireless connection. As indicated at 440, the base station compresses the rendered frames or slices and sends the compressed frames or slices to the device over the wireless connection. As indicated at 450, the device decompresses the frames or slices received from the base station and displays the frames or slices to provide a 3D virtual view including the virtual content and a view of the user's environment for viewing by the user. As indicated by the arrow returning from element 460 to element 400, the base station may continue to receive and process inputs from the sensors to render frames or slices for display by the device as long as the user is using the mixed reality system.

Rendering and transmitting entire frames may have a latency and memory impact as each frame needs to be completed, stored, and then transmitted to the next stage of the mixed reality system. In some embodiments, rather than rendering entire frames in the base station and transmitting the rendered frames to the device, the base station may render parts of frames (referred to as slices) and transmit the rendered slices to the device as they are ready. A slice may be one or more lines of a frame, or may be an N×M pixel section or region of a frame. Note that the term "frame portion" may be used herein to refer to an entire frame or to a slice of a frame as described above.

Bandwidth and Latency Constraints on the Wireless Connection

Two primary constraints to be considered on the wireless link between the device and the base station in a mixed reality system as illustrated in FIGS. 1 through 4 are bandwidth and latency. A target is to provide a high resolution, wide field of view (FOV) virtual display to the user at a frame rate (e.g., 60-120 frames per second (FPS)) that provides the user with a high-quality MR view. Another target is to minimize latency between the time a video frame is captured by the device and the time a rendered MR frame based on the video frame is displayed by the device, for example to the sub-millisecond (ms) range. Various methods and apparatus may be used in embodiments to maintain the target frame rate through the wireless link and to minimize the latency in frame rendering, transmittal, and display.

Warp Space Rendering

Some embodiments may employ warp space rendering to reduce the resolution of frames captured by the scene cameras, which reduces computation time, power usage, bandwidth usage, and latency. Ideally, there should be the same resolution on the display in any direction the user is looking. In the warp space rendering method, instead of performing a rectilinear projection when rendering a frame, which tends to oversample the edges of the image especially in wide FOV frames, a transform is applied that transforms the frame into a warp space. The warp space is then resampled at equal angles. The resampling at equal angles results in a warp space frame that has lower resolution towards the edges, and the rendering process when applied to the warp space frame results in a rendered frame that provides the same or similar resolution on the display in any direction the user is looking.

Figure 5A:
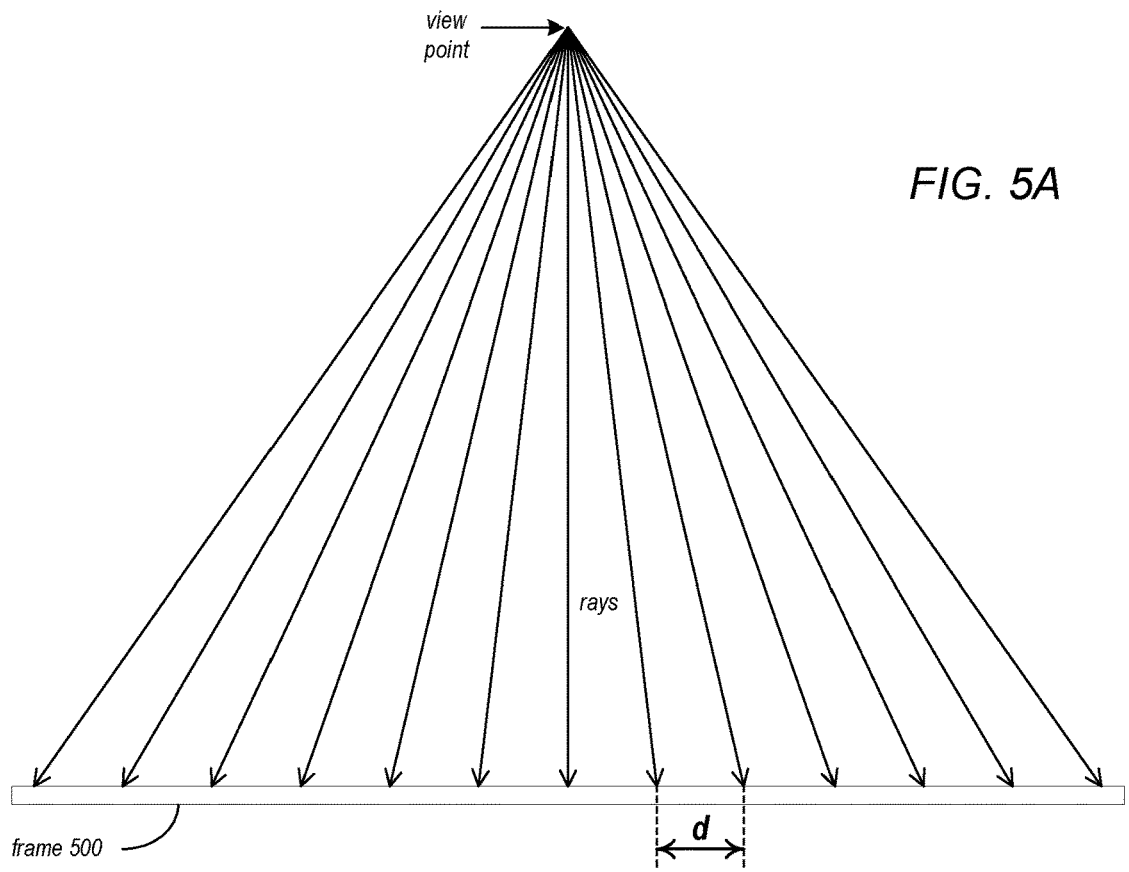
FIGS. 5A through 5D graphically illustrate warp space rendering, according to some embodiments.
Figure 5B:
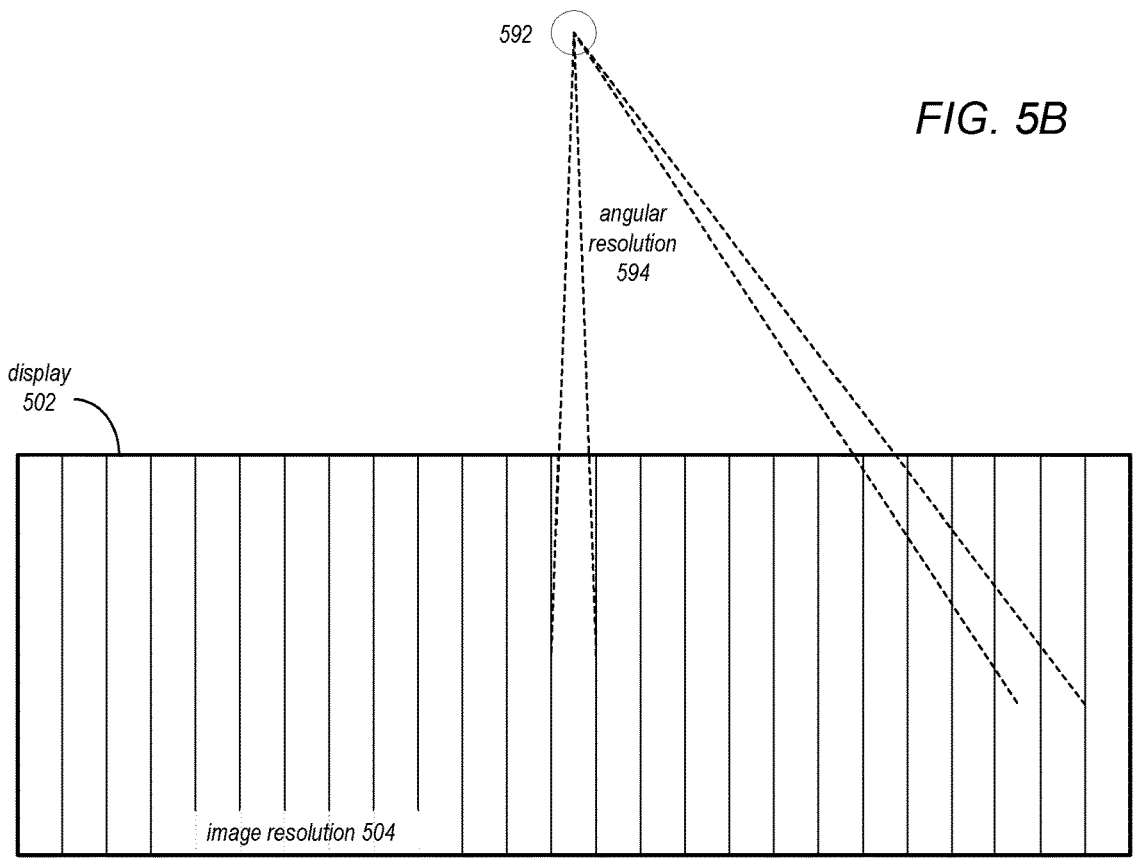

FIGS. 5A through 5D graphically illustrate warp space rendering, according to some embodiments. FIGS. 5A and 5B illustrate conventional rectilinear rendering. FIG. 5A illustrates firing rays from a view point to sample a frame 500 using a conventional rectilinear projection method. In the rectilinear projection method, rays are fired from a view point into a 3D virtual space at an equal distance d to resample a frame 500. The resampled frame is then rendered by the rendering application to generate an image for display.

As shown in FIG. 5B, the rectilinear projection method generates an image with the same resolution 504 across the display 502. Distance d may be selected to provide good detail when the user is looking at the center of the display 502. However, the human eye 592 can only resolve detail at a certain angular resolution 594. As can be seen in FIG. 5B, when the user is looking towards the edges of the display 502, the image resolution is higher than the eye's angular resolution 594. Thus, the rectilinear projection method tends to oversample towards the edges of the image. This is especially true for wide field of view displays.

Figure 5C:
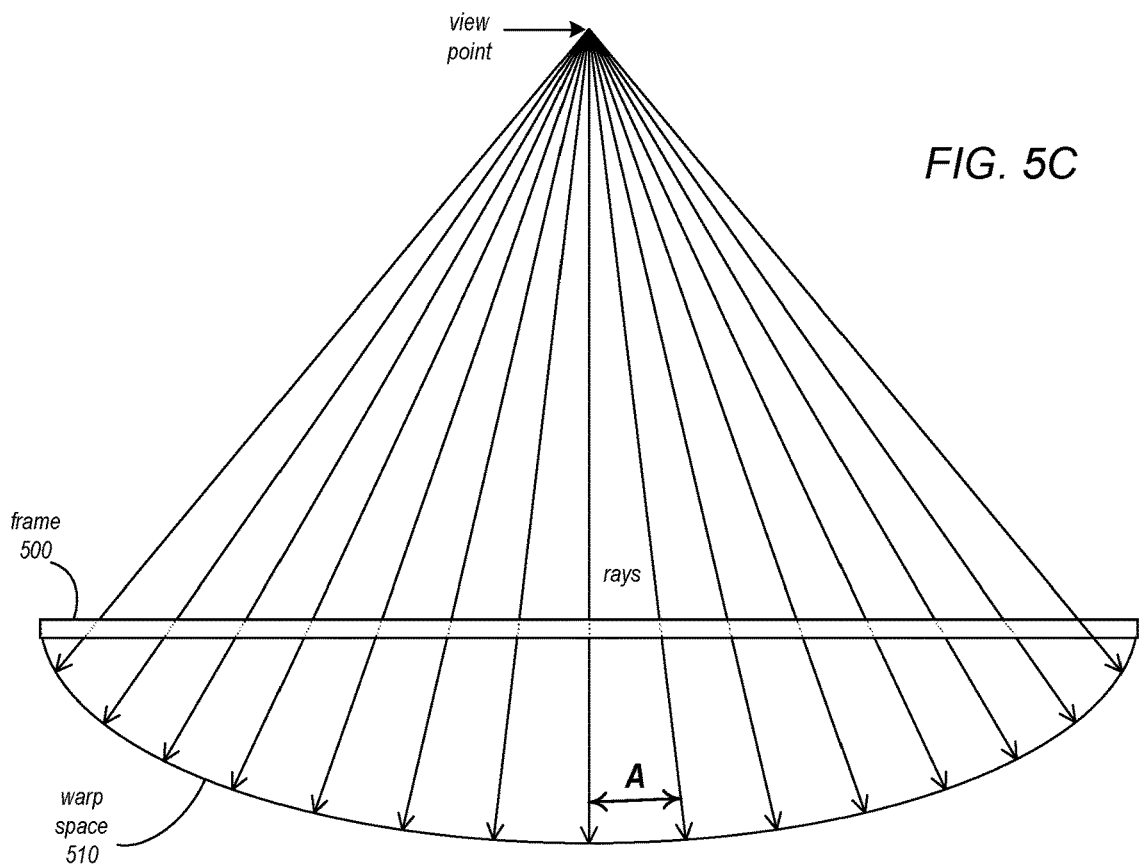
Figure 5D:
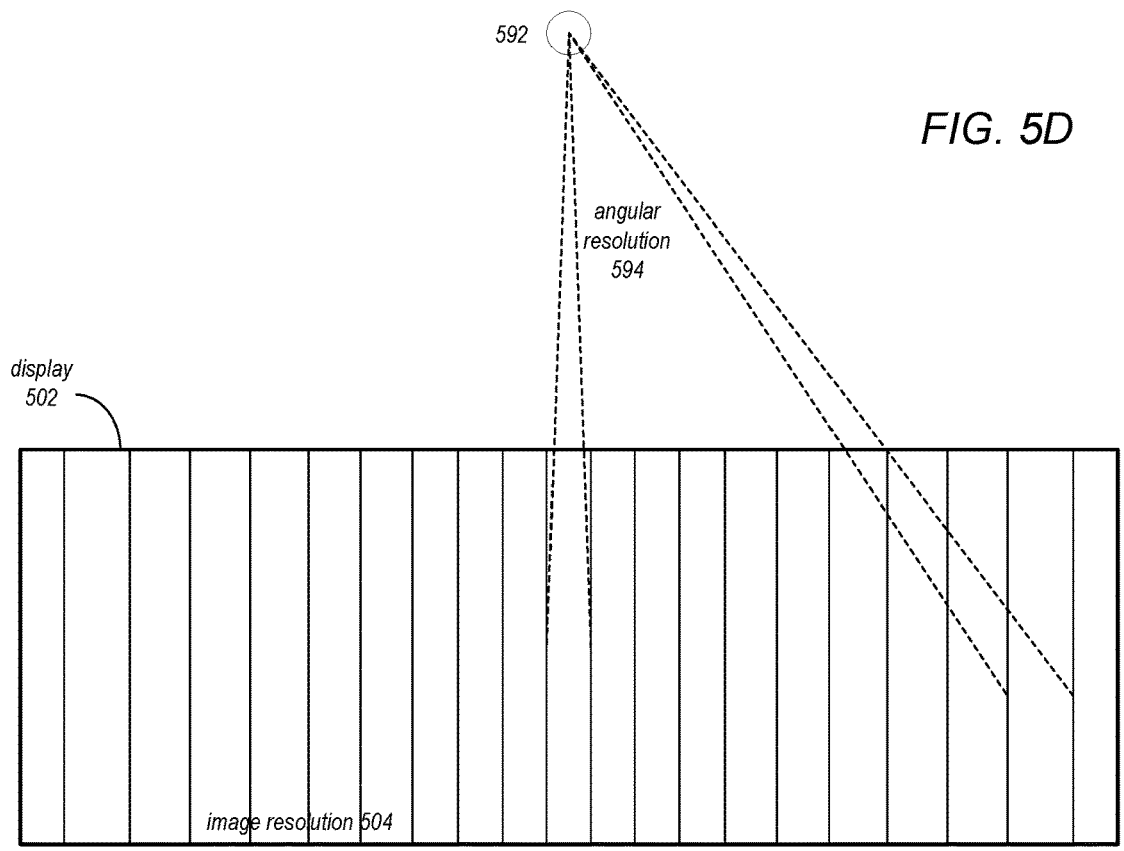

FIGS. 5C and 5D illustrate warp space rendering. FIG. 5C illustrates firing rays from a view point to sample a frame 500 using a warp space projection method. In the warp space projection method, the frame 500 is transformed into a warp space 510, and rays are fired from a view point into a 3D virtual space at an equal angle A to resample a frame 500. The resampled frame is then rendered by the rendering application to generate an image for display.

As shown in FIG. 5D, the warp space projection method generates an image with higher resolution at the center of the display 502, and lower resolution towards the edges of the display 502. As can be seen in FIG. 5D, when the user is looking towards the edges of the display 502, because the edges of the display 502 are farther from the pupil of the eye 592 than the center of the display, the lower image resolution at the edges provides similar resolution as is provided at the center of the display 502 and is not oversampled for the eye's angular resolution 594 as in the rectilinear projection method.

The warp space rendering method thus resamples the frame so that rendering engine only rasterizes and renders the number of samples it actually needs no matter what direction the user is looking at. The warp space rendering method reduces the resolution of and thus the time it takes to render a frame, which reduces latency, and also reduces the number of bits that need to be transmitted over the wireless link between the device and the base station, which reduces bandwidth usage and latency.

Figure 6:
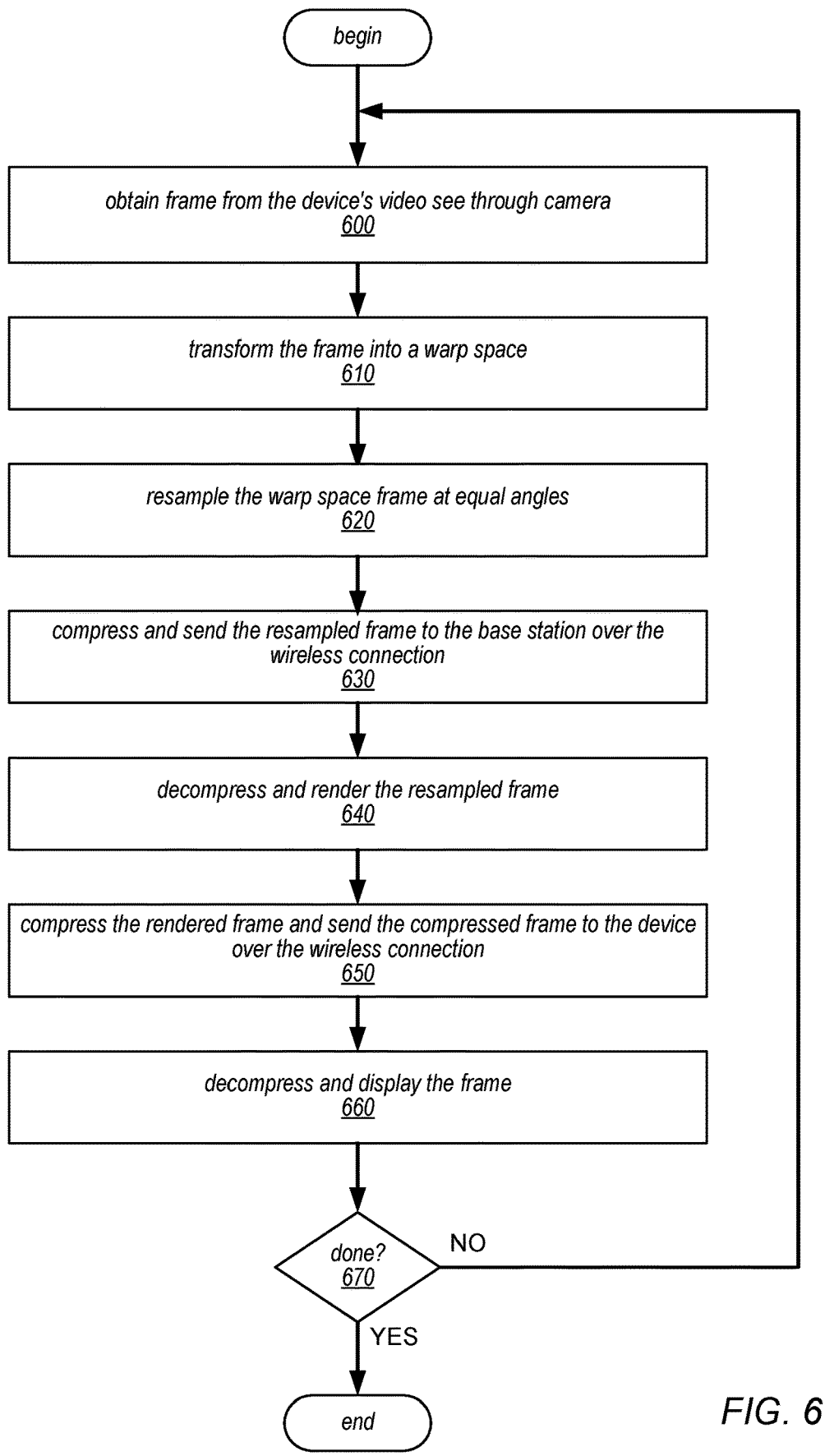
FIG. 6 is a flowchart of a method for warp space rendering to reduce the resolution at which frames are rendered by the base station, according to some embodiments.

FIG. 6 is a flowchart of a method for warp space rendering to reduce the resolution at which frames are rendered by the base station, according to some embodiments. In some embodiments, a component of the device (e.g., an ISP) may perform the warp space projection method to resample frames captured by the scene cameras before transmitting the frames to the base station. As indicated at 600, a frame may be obtained from a device scene camera. As indicated at 610, a transform may be applied to the frame to transform the frame into a warp space. As indicated at 620, the warp space frame may then be resampled at equal angles as illustrated in FIG. 5C. As indicated at 630, the resampled frame may be compressed and sent to the base station over the wireless connection. As indicated at 640, the base station may then perform rendering operations on the warp space frame to generate a rendered frame for display. As indicated at 650, the base station may then compress the rendered frame and send the compressed frame to the device over the wireless connection. As indicated at 660, the device may then decompress and display the frame. As indicated by the arrow returning from element 670 to element 60, the method may continue as long as the user is using the mixed reality system.

Foveated Rendering

Figure 7:
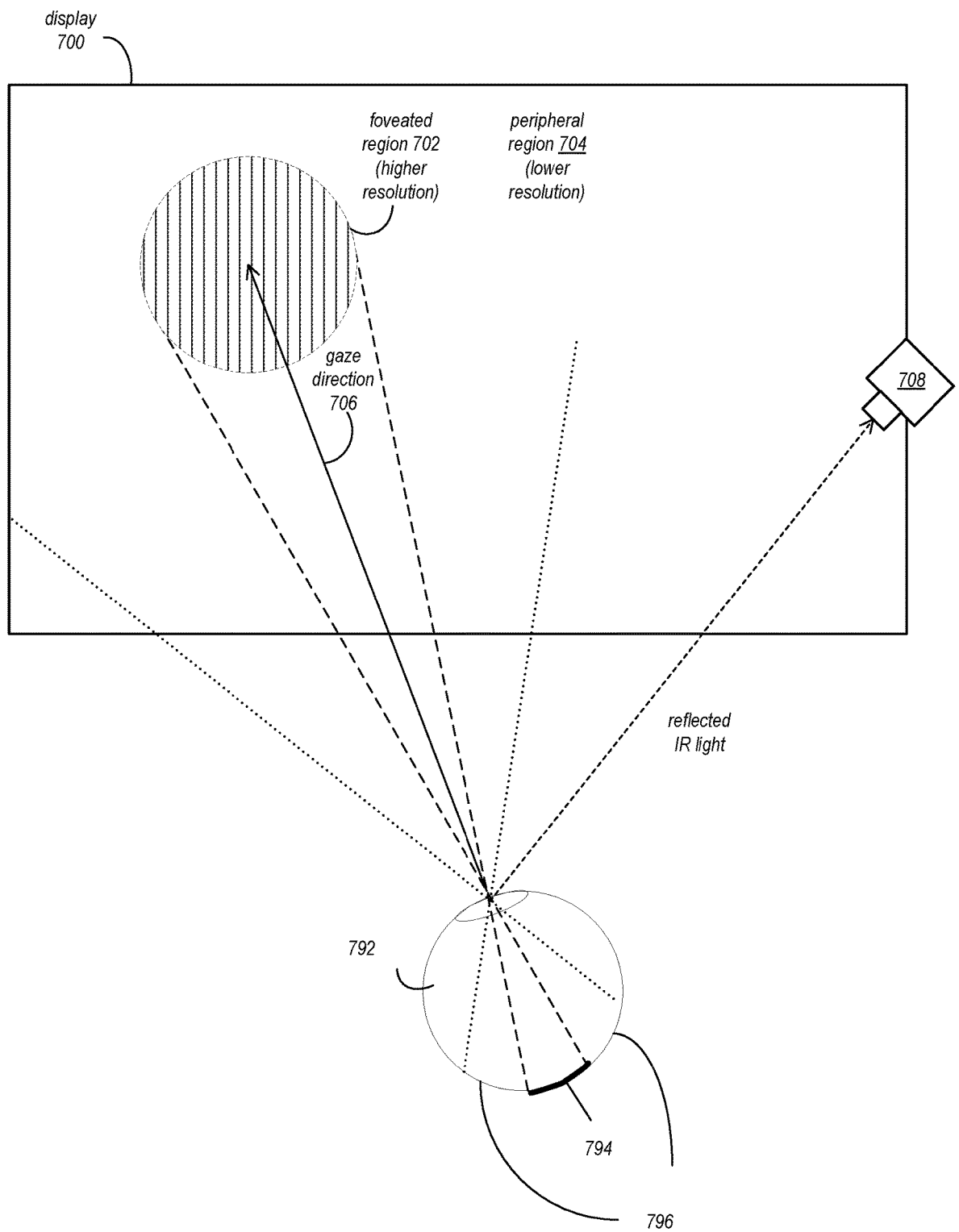
FIG. 7 graphically illustrates foveated rendering, according to some embodiments.

Another method that may be used in some embodiments may be referred to as foveated rendering, which may be used to reduce the resolution of frames rendered by the base station before transmitting the frames to the device, which reduces bandwidth usage and latency. FIG. 7 graphically illustrates foveated rendering, according to some embodiments. In the foveated rendering method, gaze tracking information received by the base station from the gaze tracking camera 708 of the device may be used to identify the direction in which the user is currently looking (referred to as the gaze direction 706). The human eye 792 can perceive higher resolution at the fovea 794 than in the peripheral region 796 of the retina. A region of the frame that corresponds to the fovea (referred to as the foveated region 702) may be estimated from the determined gaze direction 706 and known parameters (e.g., eye 792 parameters and distance from the eye 792 to the display 700). The foveated region 702 may be transmitted to the device via the wireless connection at a higher resolution (e.g., the resolution at which it was rendered), while the frame outside the foveated region 702 (referred to as the peripheral region 704) may be converted to a lower resolution before transmission to the device, for example by applying a filter (e.g., a band pass filter) to the peripheral region 704. The foveated rendering method reduces the number of pixels in the rendered image, which reduces the number of bits that need to be transmitted over the wireless link to the device, which reduces bandwidth usage and latency. In addition, in some embodiments, the peripheral region 704 outside the foveated region 702 of the frames may be transmitted over the wireless connection at a lower frame rate than the foveated region 702.

Figure 8:
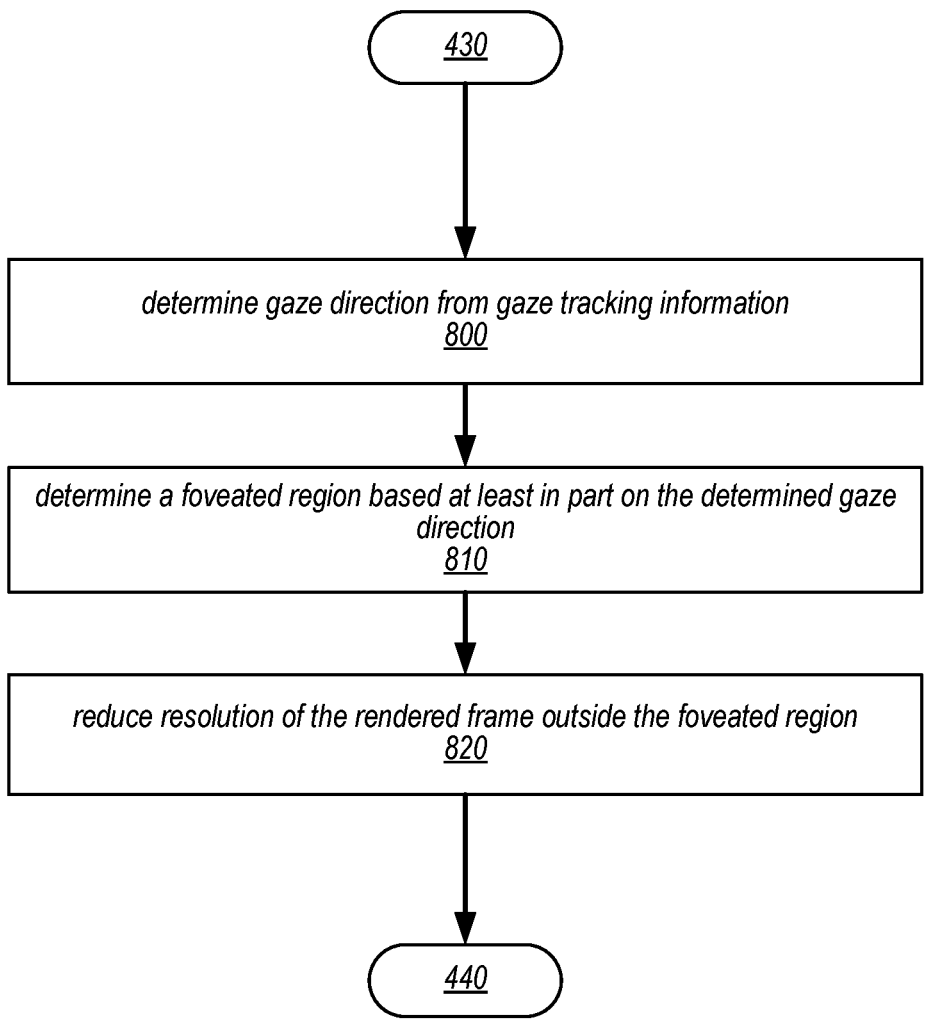
FIG. 8 is a flowchart of a method for foveated rendering to reduce the resolution of rendered frames before transmitting the frames over the wireless connection, according to some embodiments.

FIG. 8 is a flowchart of a method for foveated rendering to reduce the resolution of rendered frames before transmitting the frames over the wireless connection, according to some embodiments. The method of FIG. 8 may, for example, be performed between elements 430 and 440 of FIG. 4.

The base station may render a frame as shown at 430 of FIG. 4. As indicated at 800, the base station may determine the user's gaze direction from gaze tracking information received from the device. In some embodiments, a gaze tracking camera (e.g., an IR camera) may capture images of the user's eye. The captured images may be transmitted to the base station over the wireless connection. The base station may then analyze the images of the eye to estimate the user's current gaze direction. As indicated at 810, a foveated region may be determined according to the gaze direction. In some embodiments, the foveated region may be estimated from the determined gaze direction and known parameters (e.g., eye parameters and distance from the eye to the display 700). As indicated at 820, the resolution of the rendered frame outside of the foveated region (referred to as the peripheral region) may be reduced, for example by applying a filter (e.g., a band pass filter) to the peripheral region. The rendered frame with reduced resolution in the peripheral region may then be compressed and transmitted to the device over the wireless connection as shown at 440 of FIG. 4.

Since the user does not resolve the peripheral region as well as the foveated region, it may be possible to update the peripheral region less frequently than the foveal region without the user noticing much difference. Thus, in some embodiments, the frame rate for updating the peripheral region may be reduced. For example, the foveal region of the frame may be transmitted to the device in every frame at the target frame rate, while the peripheral region may only be transmitted every Nth frame (e.g., every second, third, or fourth frame).

Another method that may be used in some embodiments may be referred to as foveated compression. In the foveated compressing method, a foveated region and a peripheral region may be determined, either dynamically based on the gaze direction determined from gaze tracking region or statically based on a set system parameter. In some embodiments, the peripheral region may be pre-filtered to reduce information based on knowledge of the human vision system, for example by filtering high frequency information and/or increasing color compression. The amount of filtering applied to the peripheral region may increase extending towards the periphery of the image. Pre-filtering of the peripheral region may result in improved compression of the frame. Alternatively, a higher compression ratio may be used in the peripheral region.

Dynamic Rendering

Another method that may be used in some embodiments may be referred to as dynamic rendering. In the dynamic rendering method, to maintain a target frame rate and latency, a monitoring process on the base station may monitor bandwidth usage on the wireless connection and the rate at which the rendering application on the base station is taking to generate frames. Upon detecting that the bandwidth usage is above a bandwidth threshold or that the frame rendering rate is below a rendering threshold, the monitoring process may dynamically adjust one or more rendering processes on the base station to reduce the complexity of rendering a frame and thus the resolution of the rendered frames so that a target frame rate and latency to the device can be maintained. Upon detecting that the bandwidth usage is below the bandwidth threshold or that the frame rendering rate is above the rendering threshold, the rendering processes may be adjusted to increase the complexity of rendering a frame and thus the resolution of the frame.

In some embodiments, processing of a frame before the encoding process may be divided into a number of layers including a base layer and one or more additional layers so that the number of layers that are transmitted to the device can be varied based on performance of the wireless connection. Dynamically adjusting the one or more rendering processes may involve prioritizing one or more of the layers; the other layers may not be rendered. The base layer is the most important; if the base layer is not generated, the system will have to drop a frame. With the base layer, a frame can be rendered and displayed with at least a certain level of quality. As additional layers are included, quality of the rendered and displayed frames improves.

Figure 9:
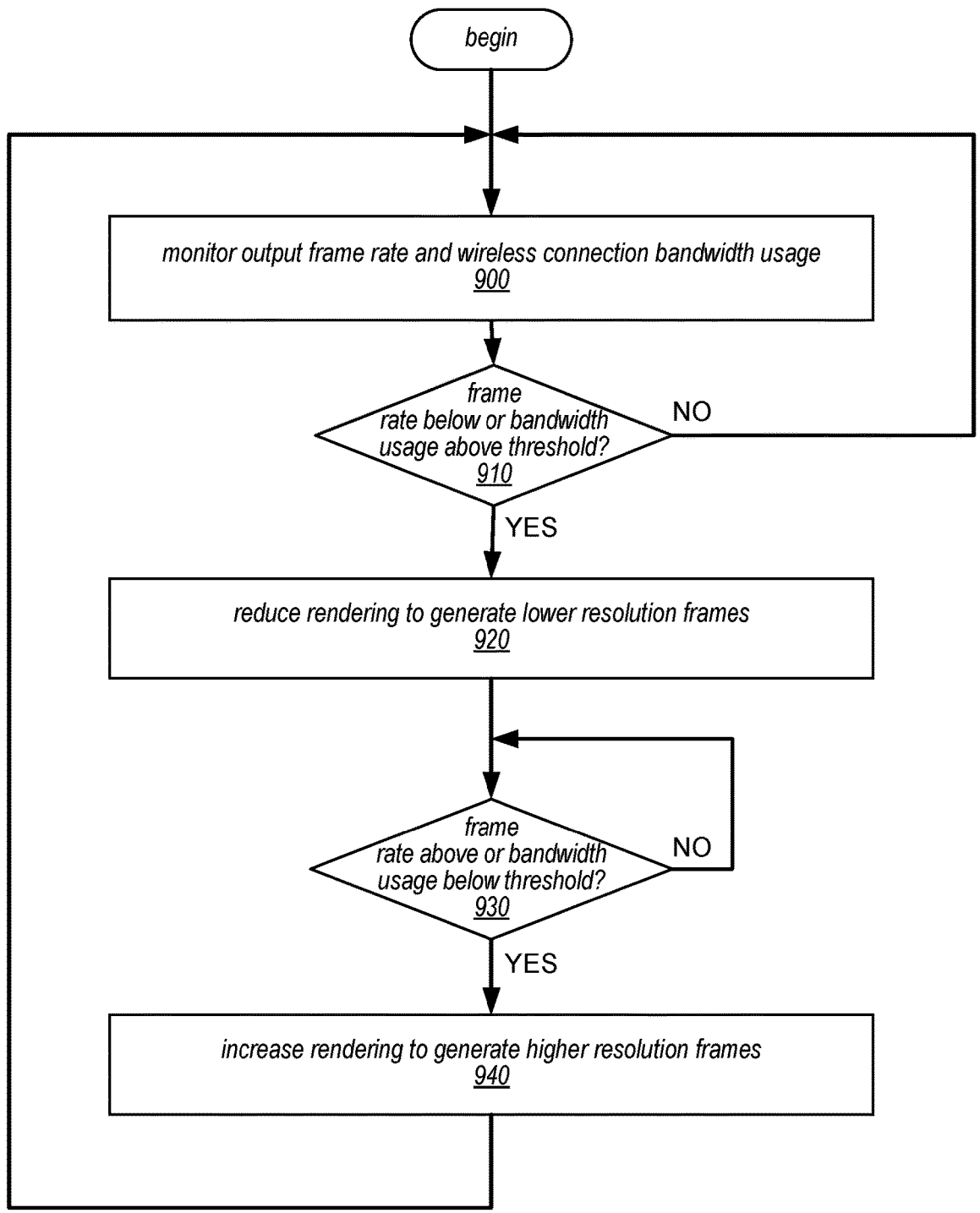
FIG. 9 is a flowchart of a method for dynamic rendering to maintain a target frame rate and latency over the wireless connection, according to some embodiments.

FIG. 9 is a flowchart of a method for dynamic rendering to maintain a target frame rate and latency over the wireless connection, according to some embodiments. As indicated at 900, a process on the base station may monitor the output frame rate of the rendering process on the base station, and may also monitor bandwidth usage on the wireless connection. In some embodiments, to monitor the output frame rate, an output buffer amount for a frame being rendered may be monitored to insure that the rendering application is going to complete the frame in time for the frame to be transmitted to the device and displayed by the device in sufficient time. At 910, if the output frame rate is below a rendering threshold or the bandwidth usage is above a bandwidth threshold, the method may go to element 920. Otherwise, the process continues to monitor the output frame rate and bandwidth usage. In some embodiments, if the output buffer amount for the current frame is detected be approaching, at, or below a buffer threshold, the rendering target for one or more subsequent frames may be reduced to keep the frames above the buffer threshold, which may help to insure that frames are not missed and that the transmittal to and display of the frames by the device remains within the target latency. After the rendering target is reduced, the rendering application generates frames at a lower resolution and/or frames with less virtual content added to the frames, which decreases the time it takes to render a frame as well as the bandwidth usage and thus may allow the system to maintain the target frame rate.

After reducing the rendering target at 920, the process may continue to monitor the output frame rate and bandwidth usage. At 930, if the output frame rate is detected to be above the rendering threshold or the bandwidth usage is detected to be below the bandwidth threshold, the rendering targets may be increased to generate higher resolution frames.

Instead of or in addition to dynamic rendering, another method that may be used in some embodiments may be referred to as dynamic compression. In the dynamic compression method, to maintain a target frame rate and latency, a monitoring process on the base station monitors bandwidth on the wireless link and the rate at which the rendering application on the base station is taking to generate frames. Upon detecting that the bandwidth is below a threshold or that the frame rendering rate is below a threshold, the monitoring process may dynamically adjust one or more compression processes on the base station to increase the compression ratio and/or increase pre-filtering of the image to reduce high frequency content so that a target frame rate and latency to the device can be maintained. The compression process(es) may be adjusted again to reduce the compression ratio and/or pre-filtering upon detecting that the monitored metrics have reached or exceeded the threshold. Dynamic compression may be implemented according to a method similar to that shown in FIG. 9 for dynamic rendering.

Motion-Based Rendering

Another method that may be used in some embodiments may be referred to as motion-based rendering. In this method, motion tracking information received from the device may be used to identify motion of the user's head. If the user is not moving their head or not moving it much, frames may be rendered and sent to the device at a lower frame rate. There may be little or no perceived difference to the user at the lower frame rate because the user's head is not in rapid motion. If rapid head motion is detected, the frame rate may be increased.

Figure 10:
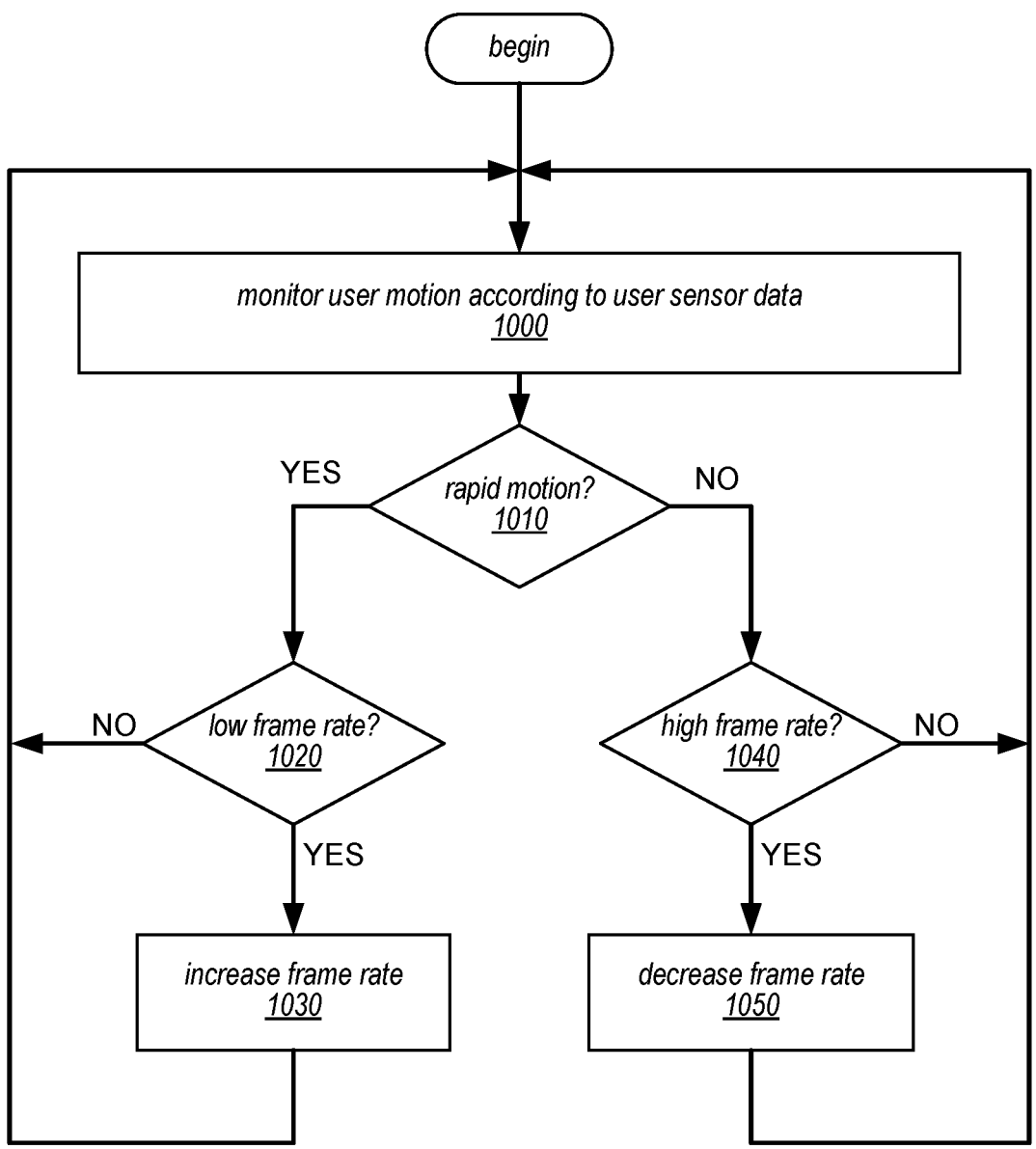
FIG. 10 is a flowchart of a method for motion-based rendering to maintain a target frame rate and latency over the wireless connection, according to some embodiments.

FIG. 10 is a flowchart of a method for motion-based rendering to maintain a target frame rate and latency over the wireless connection, according to some embodiments. As indicated at 1000, a process on the base station may monitor motion of the user's head according to user sensor data received from the device. In some embodiments, the user sensor data may include information collected from head pose sensors of a device 200 augmented by information from an inertial-measurement unit (IMU) 206 of the device 200 as illustrated in FIG. 2. At 1010, if rapid motion of the user's head is detected, and if it is determined that the frame rate is currently low (e.g., below a target frame rate) at 1020, then the frame rate may be increased as indicated at 1030. At 1010, if rapid motion of the user's head is not detected, and if it is determined that the frame rate is currently high (e.g., at a target frame rate) at 1040, then the frame rate may be increased as indicated at 1050. As indicated by the arrows returning from elements 1020-1050 to element 100, the base station may continue to monitor motion of the user's head and adjust the frame rate accordingly as long as the user is using the mixed reality system.

Stand-Alone Mode

In some embodiments, the device may be configured to function as a stand-alone device as a fallback position if the wireless connection with the base station is lost, for example if the base station goes down or an object comes between the device and the base station, blocking the wireless link. This may, for example, be done for safety reasons so that the user can still view the real environment that they are in even if the base station is unavailable. Upon detecting that the wireless connection to the base station has been re-established, the device may switch back to processing and displaying the frames received from the base station over the wireless link.

Figure 11:
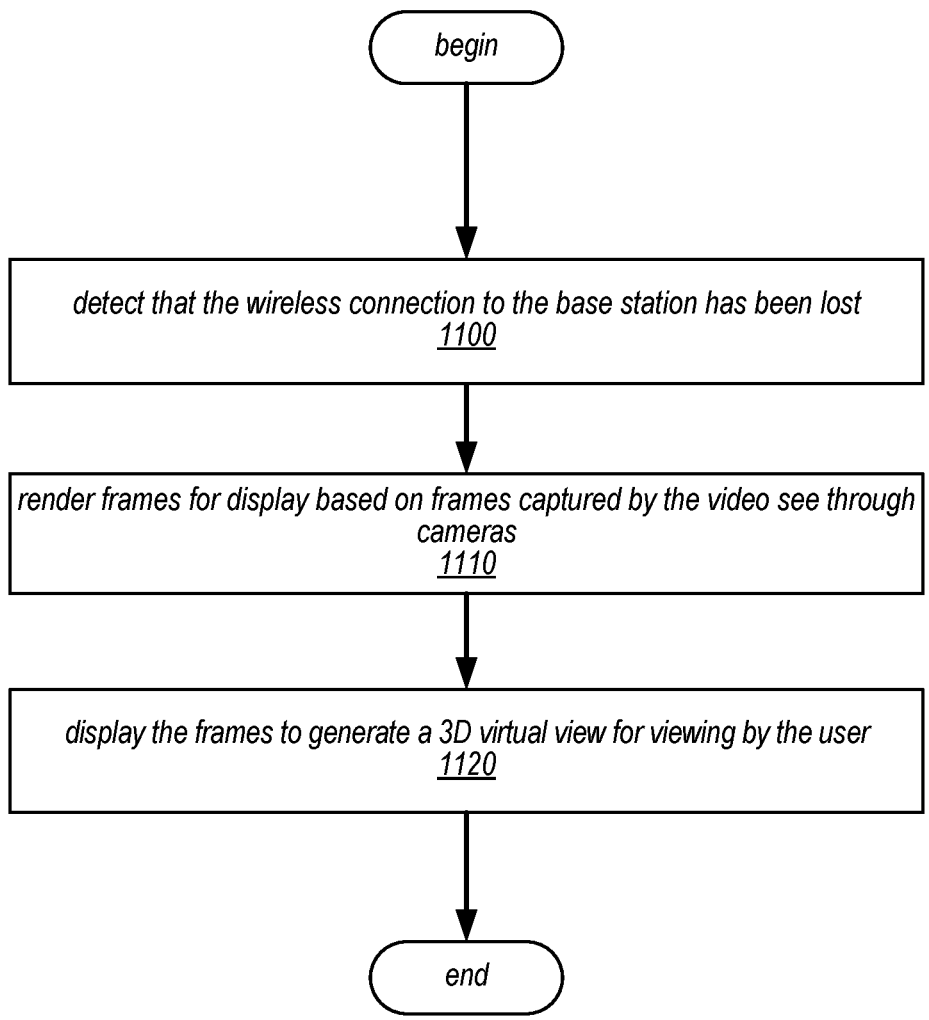
FIG. 11 is a flowchart of a method for rendering and displaying frames on the device upon detecting that the wireless connection has been lost, according to some embodiments.

FIG. 11 is a flowchart of a method for rendering and displaying frames on the device upon detecting that the wireless connection has been lost, according to some embodiments. As indicated at 1100, a process on the device may detect that the wireless connection to the base station has been lost. As indicated at 1110, upon detecting that the wireless connection has been lost, frames captured by the scene cameras of the device may be routed to a rendering engine of the device to be rendered for display. In some embodiments, a device application may execute on device processors to render virtual content to be composited with the rendered frame and displayed in the virtual view, for example a message informing the user that the wireless connection has been lost. As indicated at 1120, the device may then display the rendered frames to generate a 3D virtual view for viewing by the user. Upon detecting that the wireless connection to the base station has been re-established, the device may switch back to processing and displaying the frames received from the base station over the wireless link.

Device Frame Processing

As previously described, the device receives compressed frames from the base station via the wireless connection. The device includes a pipeline for decoding (e.g., decompression and expansion/upscale) and displaying the received frames. A goal is to maintain a target frame rate to the display of the device. Missing or incomplete frames are possible. In some embodiments, to maintain the target frame rate to the display, if a missing or incomplete frame is detected, a previous frame may be rotated based on a head pose prediction determined from head pose camera images augmented with IMU information; the rotated previous frame may then be displayed by the device in place of the current frame.

While it is possible to decode and store the current frame for use as the previous frame if a next frame is missing or incomplete, embodiments of the device as described herein may include two decoders (referred to as a current frame decoder and a previous frame decoder) and thus two decoding pipelines or paths that may operate substantially in parallel. The amount of power required to run two decoding paths is less than the amount needed to write a fully decompressed frame to memory and to read the frame from memory. Instead of simply decoding and storing the current frame for possible use as the previous frame, as the compressed frame data is received from the base station over the wireless connection and begins to be processed on the current frame decoding path, the compressed current frame data is also written to a buffer on the previous frame decoding path. In parallel with the compressed current frame being processed on the current frame decoder path and written to the previous frame buffer, the compressed previous frame data is read from the previous frame buffer and processed on the previous frame decoder path that decodes (e.g., decompression and expansion/upscale) and rotates the previous frame based on a head pose prediction determined from head pose camera images augmented with IMU information. If the current frame is detected to be missing or incomplete, the frame that was processed on the previous frame decoder path may be displayed by the device in place of the missing or incomplete current frame.

FIG. 12 is a flowchart of a method for processing and displaying frames received by the device from the base station via the wireless connection, according to some embodiments. As indicated at 1200, the device receives compressed frames from the base station via the wireless connection. Elements 1210, 1220, and 1230 may be performed substantially in parallel. As indicated at 1210, the current frame is decompressed and processed on the current frame decoding path. As indicated at 1220, the compressed current frame data is also written to a buffer on the previous frame decoding path. As indicated at 1230, the previous frame stored in the buffer is decompressed and processed on the previous frame decoding path. At 1240, if the entire current frame is determined to have been received and processed and thus ready for display, then the processed current frame is displayed by the device. Otherwise, at 1240, if the current frame is determined to be missing or incomplete, the processed previous frame, which was rotated to match predicted motion of the user, may be displayed by the device in place of the missing or incomplete current frame. As indicated by the arrow returning from element 1270 to element 1200, the device may continue to receive, process, and display frames as long as the user is using the mixed reality system.

Example Embodiments

Embodiments of the present disclosure can be described in view of the following clauses:

1. A device, comprising:
    one or more processors;
    one or more cameras configured to capture frames that include views of a user's environment; and
    a display subsystem for displaying a 3D virtual view to the user;
    wherein the one or more processors are configured to:
    transform frames captured by the one or more cameras into a warp space;
    for each frame, resample the warp space at equal angles to generate a warp space frame;
    transmit the warp space frames to a base station over a wireless connection; and
    decompress compressed rendered frames received from the base station over the wireless connection and provide the rendered frames to the display subsystem for display.
2. The device as recited in clause 1, wherein the base station renders, compresses, and transmits slices of frames to the device over the wireless connection, and wherein, to decompress the compressed rendered frames received from the base station over the wireless connection and provide the rendered frames to the display subsystem for display, the one or more processors are configured to decompress the compressed slices of the frames and provide the rendered frames to the display subsystem for display.
3. The device as recited in clause 1, wherein the rendered frames include computer generated virtual content composited with views of the user's environment or representations of objects in the user's environment composited with views of a computer generated three-dimensional (3D) virtual world.
4. The device as recited in clause 1, wherein the one or more processors are configured to compress the warp space frames before transmission to the base station over the wireless connection.
5. The device as recited in clause 1, wherein the device further comprises one or more gaze tracking cameras configured to capture images of the user's eyes, wherein the one or more processors are further configured to transmit the images captured by the gaze tracking cameras to the base station over the wireless connection, and wherein the base station is configured to render the frames based at least in part on a gaze direction determined from the images captured by the one or more gaze tracking cameras and received from the device over the wireless connection.

6. The device as recited in clause 1, wherein the device further comprises a plurality of sensors configured to capture data about the user and the user's environment, wherein the one or more processors are further configured to transmit the sensor data to the base station over the wireless connection, and wherein the base station is configured to render the frames based at least in part on the sensor data received from the device.

7. The device as recited in clause 6, wherein the plurality of sensors includes one or more of:
one or more sensors configured to capture depth information in the environment;
one or more sensors configured to track gaze direction of the user's eyes;
one or more sensors configured to track position and motion of the device in the environment; or
one or more sensors configured to track expressions of the user's face.

8. The device as recited in clause 1, wherein the device further comprises one or more depth sensors configured to capture range information for objects in the environment, wherein the one or more processors are further configured to transmit the range information to the base station over the wireless connection, wherein the base station is configured to render the frames based at least in part on the range information from the one or more depth sensors.

9. The device as recited in clause 1, wherein the device further comprises an inertial-measurement unit (IMU) and one or more head pose cameras configured to track the user's position and motion in the environment, wherein the one or more processors are configured to:
determine position of the user's head and predict motion of the user's head based on images captured by one or more head pose cameras augmented with information received from the IMU; and
transmit head position and head motion prediction information to the base station over the wireless link;
wherein the base station is configured to render the frames based at least in part on the head position and head motion prediction information received from the device.

10. The device as recited in clause 1, wherein the one or more processors are further configured to:
monitor the wireless connection to the base station;
in response to detecting that the wireless connection to the base station has been lost:
render, by the one or more processors, one or more frames that include views of the user's environment based on the frames captured by the one or more cameras; and
provide the rendered one or more frames to the display subsystem for display.

11. The device as recited in clause 1, wherein the device further comprises a memory comprising program instructions executable by at least one of the one or more processors of the device to implement a rendering application configured to generate virtual content, wherein the one or more processors are configured to composite the virtual content generated by the device with at least one of the one or more frames rendered by the device.

12. The device as recited in clause 1, wherein the device further comprises a current frame decoder and a previous frame decoder each configured to decompress and process frames received from the base station over the wireless connection, wherein the one or more processors are configured to:
receive a compressed current frame from the base station over the wireless connection;
write the compressed current frame to a previous frame buffer and pass the compressed current frame to the current frame decoder to decompress and process the current frame; and
while the current frame decoder is decompressing and processing the current frame, simultaneously decompress and process a previous frame from the previous frame buffer on the previous frame decoder.

13. The device as recited in clause 12, wherein the one or more processors are further configured to:
monitor the receiving of the compressed current frames from the base station over the wireless connection and the decompressing and processing of the current frames by the current frame decoder to detect missing or incomplete frames; and
upon detecting that a current frame is missing or incomplete, display the previous frame that was decompressed and processed by the previous frame decoder in place of the missing or incomplete current frame.

14. The device as recited in clause 12, wherein processing the previous frame on the previous frame decoder includes rotating the previous frame based on a head pose prediction determined from sensor data collected by one or more sensors of the device.

15. A system, comprising:
a base station comprising one or more processors; and
a device, comprising:
one or more processors;
one or more cameras configured to capture frames that include views of a user's environment; and
a display subsystem for displaying a 3D virtual view to the user;
wherein the device is configured to:
transform frames captured by the one or more cameras into a warp space;
for each frame, resample the warp space at equal angles to generate a warp space frame; and
transmit the warp space frames to the base station over a wireless connection;
wherein the base station is configured to:
render frame portions based at least in part on the warp space frames;
compress the rendered frame portions; and
transmit the compressed frame portions to the device over the wireless connection;
wherein the device is configured to decompress the compressed frame portions received from the base station and provide the rendered frame portions to the display subsystem for display.

16. The system as recited in clause 15, wherein a frame portion includes an entire frame or 16, a slice of a frame.

17. The system as recited in clause 15, wherein the rendered frame portions include computer generated virtual content composited with views of the user's environment or representations of objects in the user's environment composited with views of a computer generated three-dimensional (3D) virtual world.

18. The system as recited in clause 15, wherein the device is configured to compress the warp space frames before transmission to the base station over the wireless connection, and wherein the base station is configured to decompress the compressed warp space frames before rendering the frame portions from the warp space frames.

19. The system as recited in clause 15, wherein the device further comprises one or more gaze tracking cameras configured to capture images of the user's eyes, wherein the device is further configured to transmit the images captured by the gaze tracking cameras to the base station over the wireless connection, and wherein the base station is configured to, prior to compressing a rendered frame portion:
   determine a gaze direction from at least one image captured by the one or more gaze tracking cameras and received from the device over the wireless connection;
   determine a foveated region within the rendered frame portion based at least in part on the determined gaze direction; and
   apply a filter to a peripheral region of the rendered frame portion outside the foveated region to reduce resolution in the peripheral region while maintaining higher resolution in the foveated region.

20. The system as recited in clause 15, wherein the device further comprises a plurality of sensors configured to capture data about the user and the user's environment, wherein the device is further configured to transmit the sensor data to the base station over the wireless connection, and wherein, to render a frame portion from a warp space frame, the base station is configured to render the frame portion based at least in part on the sensor data received from the device.

21. The system as recited in clause 20, wherein the plurality of sensors includes one or more of:
   one or more sensors configured to capture depth information in the environment;
   one or more sensors configured to track gaze direction of the user's eyes;
   one or more sensors configured to track position and motion of the device in the environment; or
   one or more sensors configured to track expressions of the user's face.

22. The system as recited in clause 15, wherein the device further comprises one or more depth sensors configured to capture range information for objects in the environment, wherein the base station is configured to determine depths at which to render content for display in the 3D virtual view based at least in part on the range information from the one or more depth sensors.

23. The system as recited in clause 15, wherein the device further comprises an inertial-measurement unit (IMU) and one or more head pose cameras configured to track the user's position and motion in the environment, wherein the device is configured to:
   determine position of the user's head and predict motion of the user's head based on images captured by one or more head pose cameras augmented with information received from the IMU; and
   transmit head position and head motion prediction information to the base station over the wireless link;
   wherein, to render a frame portion from a warp space frame, the base station is configured to render the frame portion based at least in part on the head position and head motion prediction information received from the device.

24. The system as recited in clause 15, wherein the system is configured to render, transmit, and display rendered frame portions at a frame rate, and wherein the base station is configured to:
   monitor motion of the user's head according to sensor data received from the device;
   upon detecting that the user's head is not in rapid motion, lower the rate at which frame portions are rendered and transmitted to the device for display; and
   upon detecting rapid motion of the user's head, raise the rate at which frame portions are rendered and transmitted to the device for display.

25. The system as recited in clause 15, wherein the base station further comprises a memory comprising program instructions executable by at least one of the one or more processors to implement a rendering application configured to generate virtual content that is composited with views of the user's environment from the warp space frames based at least in part on sensor data received from the device over the wireless connection.

26. The system as recited in clause 25, wherein the system is configured to render, transmit, and display the rendered frame portions at a frame rate, and wherein the base station is configured to:
   monitor a rate at which frame portions are rendered by the rendering application on the base station; and
   in response to detecting that the rendering rate is below a threshold, direct the rendering application to reduce complexity of one or more rendering processes, wherein reducing complexity of the one or more rendering processes reduces resolution of the rendered frame portions and increases the rate at which frame portions are rendered.

27. The system as recited in clause 25, wherein the system is configured to render, transmit, and display the rendered frame portions at a target frame rate, and wherein the base station is configured to:
   monitor bandwidth usage on the wireless connection between the device and the base station; and
   in response to detecting that the bandwidth usage is above a threshold, direct the rendering application to reduce complexity of one or more rendering processes, wherein reducing complexity of the one or more rendering processes reduces resolution of the rendered frame portions.

28. The system as recited in clause 15, wherein the device is configured to:
   monitor the wireless connection to the base station;
   in response to detecting that the wireless connection to the base station has been lost:
   render, by the device, one or more frames that include views of the user's environment based on the frames captured by the one or more cameras; and
   provide the rendered one or more frames to the display subsystem for display.

29. The system as recited in clause 15, wherein the device further comprises a memory comprising program instructions executable by at least one of the one or more processors of the device to implement a rendering application configured to generate virtual content, wherein the device is further configured to composite the virtual content generated by the device with at least one of the one or more frames rendered by the device.

30. The system as recited in clause 15, wherein the device further comprises a current frame decoder and a previous frame decoder each configured to decompress and process frames received from the base station over the wireless connection, wherein the device is configured to:
    receive a compressed current frame from the base station over the wireless connection;
    write the compressed current frame to a previous frame buffer and pass the compressed current frame to the current frame decoder to decompress and process the current frame; and
    while the current frame decoder is decompressing and processing the current frame, simultaneously decompress and process a previous frame from the previous frame buffer on the previous frame decoder.

31. The system as recited in clause 30, wherein the device is further configured to:
    monitor the receiving of the compressed current frames from the base station over the wireless connection and the decompressing and processing of the current frames by the current frame decoder to detect missing or incomplete frames; and
    upon detecting that a current frame is missing or incomplete, display the previous frame that was decompressed and processed by the previous frame decoder in place of the missing or incomplete current frame.

32. The system as recited in clause 30, wherein processing the previous frame on the previous frame decoder includes rotating the previous frame based on a head pose prediction determined from sensor data collected by one or more sensors of the device.

33. A method, comprising:
    capturing, by one or more cameras of a head-mounted display (device) worn by a user, frames that include views of the user's environment;
    transforming, by the device, the frames captured by the one or more cameras into a warp space;
    for each frame, resampling the warp space at equal angles to generate a warp space frame;
    transmitting the warp space frames to a base station over a wireless connection;
    rendering, by the base station, frame portions based at least in part on the warp space frames;
    compressing the rendered frame portions;
    transmitting the compressed frame portions to the device over the wireless connection;
    decompressing, by the device, the compressed frame portions received from the base station; and
    displaying, by the device, the rendered frame portions to provide a 3D virtual view to the user.

34. The method as recited in clause 33, wherein a frame portion includes an entire frame or a slice of a frame.

35. The method as recited in clause 33, wherein the rendered frame portions include computer generated virtual content composited with views of the user's environment or representations of objects in the user's environment composited with views of a computer generated three-dimensional (3D) virtual world.

36. The method as recited in clause 33, further comprising compressing the warp space frames before transmission to the base station over the wireless connection, and decompressing the compressed warp space frames before rendering the frame portions from the warp space frames.

37. The method as recited in clause 33, further comprising:
    capturing, by or more gaze tracking cameras of the device, images of the user's eyes;
    transmitting the images captured by the gaze tracking cameras to the base station over the wireless connection;
    prior to compressing a rendered frame portion, the base station performing:
    determining a gaze direction from at least one image captured by the one or more gaze tracking cameras and received from the device over the wireless connection;
    determining a foveated region within the rendered frame portion based at least in part on the determined gaze direction; and
    applying a filter to a peripheral region of the rendered frame portion outside the foveated region to reduce resolution in the peripheral region while maintaining higher resolution in the foveated region.

38. The method as recited in clause 33, further comprising:
    capturing, by a plurality of sensors of the device, sensor data about the user and the user's environment; and
    transmitting the sensor data to the base station over the wireless connection; wherein rendering a frame portion from a warp space frame comprises rendering the frame portion based at least in part on the sensor data received from the device.

39. The method as recited in clause 38, wherein the plurality of sensors includes one or more depth sensors configured to capture range information for objects in the environment, wherein rendering a frame portion from a warp space frame comprises determining depth at which to render content in the 3D virtual view based at least in part on the range information from the one or more depth sensors.

40. The method as recited in clause 38, further comprising:
    determining, by the device, position of the user's head and predicting motion of the user's head based on images captured by the one or more head pose cameras augmented with information received from an inertial-measurement unit (IMU) of the device; and
    transmitting head position and head motion prediction information to the base station over the wireless link;
    wherein rendering a frame portion from a warp space frame comprises rendering content in the frame portion based at least in part on the head position and head motion prediction information received from the device.

41. The method as recited in clause 38, further comprising:
    monitoring motion of the user's head according to the sensor data received from the device;
    upon detecting that the user's head is not in rapid motion, lowering a frame rate at which the frame portions are rendered and transmitted to the device for display; and
    upon detecting rapid motion of the user's head, raising the frame rate at which the frame portions are rendered and transmitted to the device for display.

42. The method as recited in clause 33, further comprising:
monitoring a rate at which frame portions are rendered by a rendering application on the base station; and
in response to detecting that the rendering rate is below a threshold, directing the rendering application to reduce complexity of one or more rendering processes, wherein reducing complexity of the one or more rendering processes reduces resolution of the rendered frame portions and increases the rate at which frame portions are rendered.

43. The method as recited in clause 33, further comprising:
monitoring bandwidth usage on the wireless connection between the device and the base station; and
in response to detecting that the bandwidth usage is above a threshold, directing a rendering application on the base station to reduce complexity of one or more rendering processes, wherein reducing complexity of the one or more rendering processes reduces resolution of the rendered frame portions.

44. The method as recited in clause 33, further comprising, in response to the device detecting that the wireless connection to the base station has been lost:
rendering, by the device, one or more frames that include views of the user's environment based on the frames captured by the one or more cameras;
generating, by the device, virtual content that indicates that the wireless connection has been lost;
compositing the virtual content with at least one of the one or more rendered frames; and
displaying, by the device, the rendered one or more frames including the virtual content to the user.

45. The method as recited in clause 33, further comprising:
receiving, by the device, a compressed current frame from the base station over the wireless connection;
writing the compressed current frame to a previous frame buffer and passing the compressed current frame to a current frame decoder of the device to decompress and process the current frame; and
while the current frame decoder is decompressing and processing the current frame, simultaneously decompressing and processing a previous frame from the previous frame buffer on a previous frame decoder of the device, wherein processing the previous frame by the previous frame decoder includes rotating the previous frame based on a head pose prediction determined from sensor data collected by one or more sensors of the device.

46. The method as recited in clause 45, further comprising:
monitoring, by the device, the receiving of the compressed current frames from the base station over the wireless connection and the decompressing and processing of the current frames by the current frame decoder to detect missing or incomplete frames; and
upon detecting that a current frame is missing or incomplete, displaying the previous frame that was decompressed and processed by the previous frame decoder in place of the missing or incomplete current frame.

47. A device, comprising:
one or more processors;
one or more cameras configured to capture frames that include views of a user's environment; and
a display subsystem;
wherein the one or more processors are configured to:
transform frames captured by the one or more cameras into a warp space; and
for each frame, resample the warp space at equal angles to generate a warp space frame;
transmit the warp space frames to a base station over a wireless connection;
receive compressed rendered frame portions from the base station over the wireless connection, wherein the rendered frame portions include virtual content composited with the warp space frames by the base station; and
decompress the compressed rendered frame portions received from the base station; and
wherein the display subsystem is configured to display the rendered frame portions to provide a 3D virtual view to the user.

48. The device as recited in clause 47, wherein a frame portion includes an entire frame or a slice of a frame.

49. The device as recited in clause 47, wherein the rendered frame portions include computer generated virtual content composited with views of the user's environment or representations of objects in the user's environment composited with views of a computer generated three-dimensional (3D) virtual world.

50. The device as recited in clause 47, further comprising a plurality of sensors configured to capture data about the user and the user's environment, wherein the one or more processors are further configured to transmit the sensor data to the base station over the wireless connection, wherein the base station renders the frame portions including virtual content composited with the warp space frames based at least in part on the sensor data received from the device.

51. The device as recited in clause 50, wherein the plurality of sensors includes one or more of:
one or more sensors configured to capture depth information in the environment;
one or more sensors configured to track gaze direction of the user's eyes;
one or more sensors configured to track position and motion of the device in the environment; or one or more sensors configured to track expressions of the user's face.

52. The device as recited in clause 47, wherein the device further comprises:
an inertial-measurement unit (IMU); and
one or more head pose cameras configured to track the user's position and motion in the environment;
wherein the one or more processors are further configured to:
determine position of the user's head and predict motion of the user's head based on images captured by the one or more head pose cameras augmented with information received from the IMU; and
transmit head position and head motion prediction information to the base station over the wireless link;
wherein the base station renders the frame portions including virtual content composited with the warp space frames based at least in part on the head position and head motion prediction information received from the device.

53. The device as recited in clause 47, wherein the one or more processors are further configured to:
monitor the wireless connection to the base station;
in response to detecting that the wireless connection to the base station has been lost:

render one or more frames that include views of the user's environment based on the frames captured by the one or more cameras; and provide the rendered one or more frames to the display subsystem for display.

54. The device as recited in clause 53, wherein the device further comprises a memory comprising program instructions executable by at least one of the one or more processors to implement a rendering application configured to generate virtual content, wherein the one or more processors are further configured to composite the virtual content generated by the device with at least one of the one or more frames rendered by the device.

55. The device as recited in clause 47, further comprising a current frame decoder and a previous frame decoder each configured to decompress and process frames received from the base station over the wireless connection, wherein the one or more processors are further configured to:

receive a compressed current frame from the base station over the wireless connection;

write the compressed current frame to a previous frame buffer and pass the compressed current frame to the current frame decoder to decompress and process the current frame; and while the current frame decoder is decompressing and processing the current frame, simultaneously decompress and process a previous frame from the previous frame buffer on the previous frame decoder.

56. The device as recited in clause 55, wherein the one or more processors are further configured to:

monitor the receiving of the compressed current frames from the base station over the wireless connection and the decompressing and processing of the current frames by the current frame decoder to detect missing or incomplete frames; and upon detecting that a current frame is missing or incomplete, display the previous frame that was decompressed and processed by the previous frame decoder in place of the missing or incomplete current frame.

57. The device as recited in clause 55, wherein processing the previous frame on the previous frame decoder includes rotating the previous frame based on a head pose prediction determined from sensor data collected by one or more sensors of the device.

58. A device, comprising:

one or more processors; and a memory comprising program instructions executable by the one or more processors to:

receive warp space frames from a head-mounted device (HMD) via a wireless connection, wherein the warp space frames include views of an environment captured by one or more cameras of the HMD, wherein the warp space frames are generated by the HMD by transforming frames captured by the one or more cameras into a warp space and resampling the warp space to generate a warp space frame;

render frame portions that include virtual content composited with views of the user's environment from the warp space frames;

compress the rendered frame portions; and transmit the compressed rendered frame portions to the HMD over the wireless connection for display to the user, wherein the displayed rendered frame portions provide a 3D virtual view of the environment that includes the virtual content to a user wearing the HMD.

59. The device as recited in clause 58, wherein a frame portion includes an entire frame or a slice of a frame.

60. The device as recited in clause 58, wherein the rendered frame portions include computer generated virtual content composited with views of the user's environment or representations of objects in the user's environment composited with views of a computer generated three-dimensional (3D) virtual world.

61. The device as recited in clause 58, wherein the program instructions are further executable by the one or more processors to:

receive images captured by gaze tracking cameras of the HMD via the wireless connection; and prior to compressing a rendered frame portion:

determine a gaze direction from at least one image captured by the one or more gaze tracking cameras;

determine a foveated region within the rendered frame portion based at least in part on the determined gaze direction; and apply a filter to a peripheral region of the rendered frame portion outside the foveated region to reduce resolution in the peripheral region while maintaining higher resolution in the foveated region.

62. The device as recited in clause 58, wherein, to compress a rendered frame portion, the program instructions are further executable by the one or more processors to:

determine a foveated region within the rendered frame portion;

compress the foveated region of the rendered frame portion at a compression ratio; and compress a peripheral region of the rendered frame portion at a higher compression ratio than the compression ration used for foveated region.

63. The device as recited in clause 58, wherein the program instructions are further executable by the one or more processors to:

receive sensor data captured from the user and the user's environment by a plurality of sensors of the HMD from the HMD via the wireless connection; and render the frame portions based at least in part on the sensor data received from the HMD.

64. The device as recited in clause 63, wherein the plurality of sensors include one or more depth sensors configured to capture range information for objects in the environment, wherein the program instructions are further executable by the one or more processors to render content for display in the 3D virtual view based at least in part on the range information from the one or more depth sensors.

65. The device as recited in clause 63, wherein the plurality of sensors include:

an inertial-measurement unit (IMU); and one or more head pose cameras configured to track the user's position and motion in the environment;

wherein the program instructions are further executable by the one or more processors to render content for display in the 3D virtual view based at least in part on head position and head motion prediction information estimated from images captured by the one or more head pose cameras augmented with information from the IMU.

66. The device as recited in clause 63, wherein the program instructions are further executable by the one or more processors to:
monitor motion of the user's head according to the sensor data received from the HMD;
upon detecting that the user's head is not in rapid motion, lower the rate at which the frame portions are rendered and transmitted to the HMD for display; and
upon detecting rapid motion of the user's head, raise the rate at which the frame portions are rendered and transmitted to the HMD for display.

67. The device as recited in clause 58, wherein the program instructions are further executable by the one or more processors to:
monitor a rate at which frame portions are rendered; and
in response to detecting that the rendering rate is below a threshold, reduce complexity of one or more rendering processes, wherein reducing complexity of the one or more rendering processes reduces resolution of the rendered frame portions and increases the rate at which frame portions are rendered.

68. The device as recited in clause 58, wherein the program instructions are further executable by the one or more processors to:
monitor bandwidth usage on the wireless connection between the HMD and the base station; and
in response to detecting that the bandwidth usage is above a threshold, reduce complexity of one or more rendering processes, wherein reducing complexity of the one or more rendering processes reduces resolution of the rendered frame portions.

69. The device as recited in clause 58, wherein the program instructions are further executable by the one or more processors to:
monitor a rate at which frame portions are rendered on the base station and bandwidth usage on the wireless connection between the HMD and the base station;
in response to detecting that the rendering rate is below a rendering threshold or that the bandwidth usage is above a bandwidth threshold, adjust one or more compression processes on the base station to increase a compression ratio at which the rendered frame portions are compressed.

70. The device as recited in clause 58, wherein the program instructions are further executable by the one or more processors to:
receive warp space frames from two or more HMDs via respective wireless connections, wherein the warp space frames include views of the environment captured by the cameras of the respective HMDs;
render frame portions that include virtual content composited with views of the environment from the warp space frames;
compress the rendered frame portions; and
transmit the compressed rendered frame portions to respective ones of the two or more HMDs over the respective wireless connections for display to respective users, wherein the displayed rendered frame portions provide respective 3D virtual views of the environment including respective virtual content to the users wearing the HMDs.

71. A device, comprising:
one or more processors;
an inertial-measurement unit (IMU);
one or more head pose cameras configured to track the user's position and motion in the environment; and
a display subsystem for displaying a 3D virtual view to the user;
wherein the one or more processors are configured to:
determine position of the user's head and predict motion of the user's head based on images captured by one or more head pose cameras augmented with information received from the IMU; and
transmit head position and head motion prediction information to a base station over a wireless link, wherein the base station renders frames based at least in part on the head position and head motion prediction information received from the device; and
decompress compressed rendered frames received from the base station over the wireless connection and provide the rendered frames to the display subsystem for display.

72. A device, comprising:
one or more processors;
a display subsystem for displaying a 3D virtual view to the user;
a current frame decoder and a previous frame decoder each configured to decompress and process frames received from a base station over a wireless connection;
wherein the one or more processors are configured to:
receive a compressed current frame from the base station over the wireless connection;
write the compressed current frame to a previous frame buffer and pass the compressed current frame to the current frame decoder to decompress and process the current frame; and
while the current frame decoder is decompressing and processing the current frame, simultaneously decompress and process a previous frame from the previous frame buffer on the previous frame decoder.

73. The device as recited in clause 72, wherein the one or more processors are further configured to:
monitor the receiving of the compressed current frames from the base station over the wireless connection and the decompressing and processing of the current frames by the current frame decoder to detect missing or incomplete frames; and
upon detecting that a current frame is missing or incomplete, display the previous frame that was decompressed and processed by the previous frame decoder in place of the missing or incomplete current frame.

74. The device as recited in clause 72, wherein processing the previous frame on the previous frame decoder includes rotating the previous frame based on a head pose prediction determined from sensor data collected by one or more sensors of the device.

Example Mixed Reality System

Figure 13:
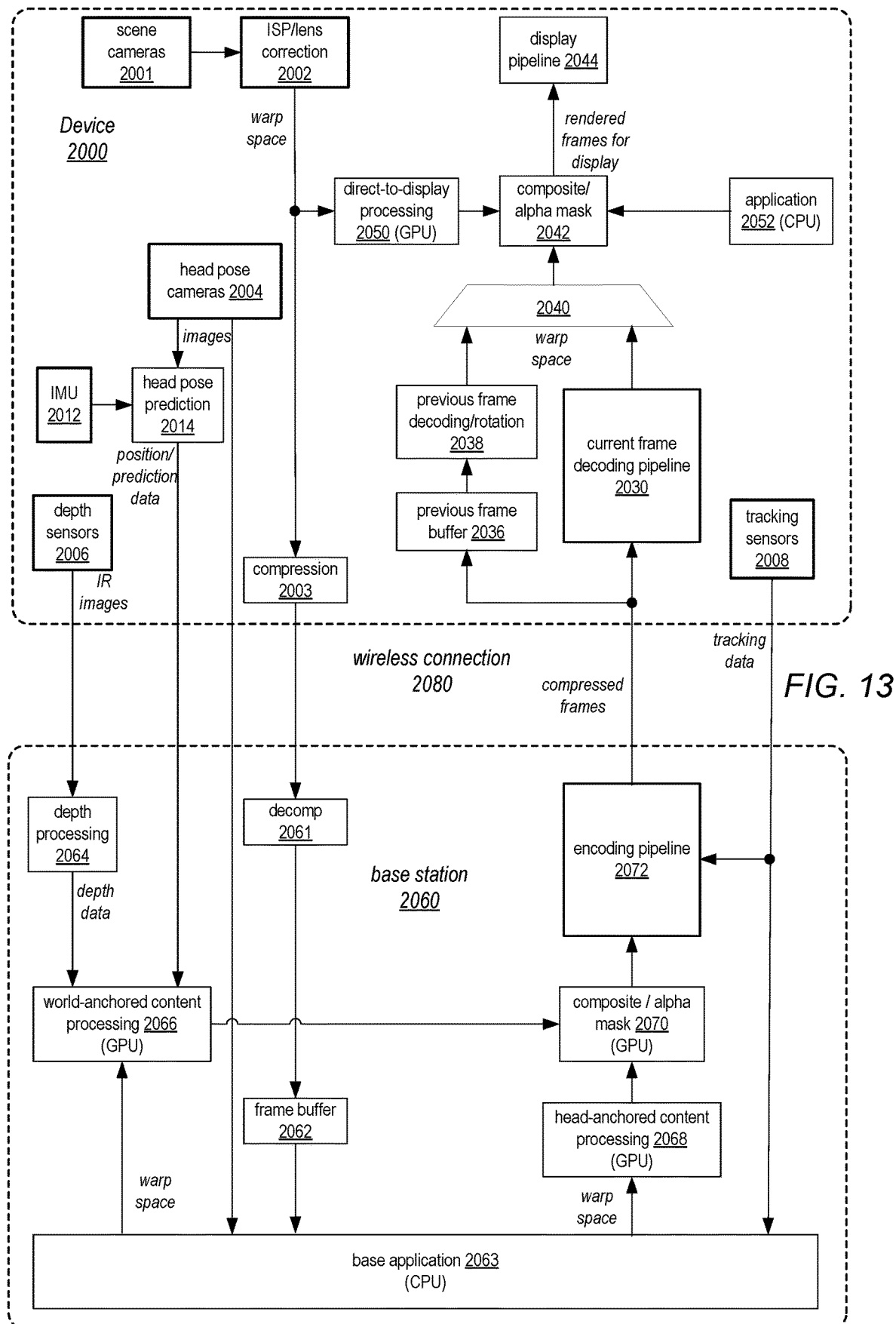
FIG. 13 is a block diagram illustrating functional components of and processing in an example mixed reality system as illustrated in FIGS. 1 through 12, according to some embodiments.

FIG. 13 is a block diagram illustrating functional components of and processing in an example mixed reality system as illustrated in FIGS. 1 through 12, according to some embodiments. A mixed reality system may include a device 2000 and a base station 2060 (e.g., a computing system, game console, etc.). The device 2000 may, for example, be a head-mounted device (HMD) such as a headset, helmet, goggles, or glasses worn by the user. Device 2000 and base station 2060 may each include a wireless interface component (not shown) that allows the device 2000 and base station 2060 to exchange data over a wireless connection 2080. In some embodiments, the wireless interface may be implemented according to a proprietary wireless communications technology (e.g., 60 gigahertz (GHz) wireless technology) that provides a highly directional wireless link between the device 2000 and the base station 2060. In some embodiments, the directionality and bandwidth (e.g., 60 GHz) of the wireless communication technology may support multiple devices 2000 communicating with the base station 2060 at the same time to thus enable multiple users to use the system at the same time in a co-located environment. However, other commercial (e.g., Wi-Fi, Bluetooth, etc.) or proprietary wireless communications technologies may be supported in some embodiments.

The device 2000 may include world sensors that collect information about the user's environment (e.g., video, depth information, lighting information, etc.), and user sensors (shown collectively as tracking sensors 2008 in FIG. 13) that collect information about the user (e.g., the user's expressions, eye movement, gaze direction, hand gestures, etc.). Example world and user sensors and are shown in FIG. 2.

In some embodiments, the world sensors may include one or more scene cameras 2001 (e.g., RGB (visible light) video cameras) that capture high-quality video of the user's environment that may be used to provide the user with a virtual view of their real environment. In some embodiments there may be two scene cameras 2001 (e.g., a left and a right camera) located on a front surface of the device 2000 at positions that are substantially in front of each of the user's eyes. However, in various embodiments, more or fewer scene cameras 2001 may be used, and the scene cameras 2001 may be positioned at other locations.

In some embodiments, the world sensors may include one or more head pose cameras 2004 (e.g., IR or RGB cameras) that may capture images that may be used provide information about the position, orientation, and/or motion of the user and/or the user's head in the environment. The information collected by head pose cameras 2004 may, for example, be used to augment information collected by an inertial-measurement unit (IMU) 2012 of the device 2000 when generating position/prediction data.

In some embodiments, the world sensors may include one or more world mapping or depth sensors 2006 (e.g., infrared (IR) cameras with an IR illumination source, or Light Detection and Ranging (LIDAR) emitters and receivers/detectors) that, for example, capture depth or range information (e.g., IR images) for objects and surfaces in the user's environment.

In some embodiments, the tracking sensors 2008 may include one or more gaze tracking sensors (e.g., IR cameras with an IR illumination source) that may be used to track position and movement of the user's eyes. In some embodiments, the gaze tracking sensors may also be used to track dilation of the user's pupils. In some embodiments, there may be two gaze tracking sensors, with each gaze tracking sensor tracking a respective eye.

In some embodiments, the tracking sensors 2008 may include one or more eyebrow sensors (e.g., IR cameras with IR illumination) that track expressions of the user's eyebrows/forehead. In some embodiments, the tracking sensors 2008 may include one or more lower jaw tracking sensors (e.g., IR cameras with IR illumination) that track expressions of the user's mouth/jaw. In some embodiments, the tracking sensors 2008 may include one or more hand sensors (e.g., IR cameras with IR illumination) that track position, movement, and gestures of the user's hands, fingers, and/or arms.

Device 2000 may include a display component or subsystem that includes a display pipeline 2044 and display screen; the display component may implement any of various types of virtual reality projector technologies. For example, the device 2000 may include a near-eye VR projector that displays frames including left and right images on screens that are viewed by a user, such as DLP (digital light processing), LCD (liquid crystal display) and LCOS (liquid crystal on silicon) technology projectors. In some embodiments, the screens may be see-through displays. As another example, the device 2000 may include a direct retinal projector that scans frames including left and right images, pixel by pixel, directly to the user's eyes via a reflective surface (e.g., reflective eyeglass lenses).

Device 2000 may include one or more of various types of processors (system on a chip (SOC), CPUs, image signal processors (ISPs), graphics processing units (GPUs), coder/decoders (codecs), etc.) that may, for example perform initial processing (e.g., compression) of the information collected by the world and tracking sensors before transmitting the information vial the wireless connection 2080 to the base station 2060, and that may also perform processing (e.g., decoding/decompression) of compressed frames received from the base station 2060 prior to providing provide the processed frames to the display subsystem for display.

Device 2000 may include a software application 2052 (referred to as a device application), configured to execute on at least one processor (e.g., a CPU) of the device 2000 to generate content based at least in part on sensor inputs from the device 2000 to be displayed in a 3D virtual view to the user by the device 2000.

Base station 2060 may include software and hardware (e.g., processors (system on a chip (SOC), CPUs, image signal processors (ISPs), graphics processing units (GPUs), coder/decoders (codecs), etc.), memory, etc.) configured to generate and render frames that include virtual content based at least in part on the sensor information received from the device 2000 via the wireless connection 2080 and to compress and transmit the rendered frames to the device 2000 for display via the wireless connection 2080.

Base station 2060 may include a software application 2063 (referred to as a base application), for example a mixed reality or virtual reality application, configured to execute on at least one processor (e.g., a CPU) of the base station 2060 to generate content based at least in part on sensor inputs from the device 2000 to be displayed in a 3D virtual view to the user by the device 2000. The content may include world-anchored content (content including a virtual view of the user's environment based on scene camera 2001 input and generated virtual content anchored to that view) and head-anchored content (generated virtual content that tracks the motion of the user's head).

The following describes data flow in and operations of the mixed reality system as illustrated in FIG. 13.

Scene cameras 2001 capture video frames of the user's environment. The captured frames may be initially processed, for example by an ISP 2002 on a SOC of the device 2000, compressed 2003, and transmitted to the base station 2060 over the wireless connection 2080. The initial processing may include, but is not limited to, one or more lens corrections. In some embodiments, ISP 2002 may perform a warp space projection method as illustrated in FIGS. 5A-5B and 6 to resample frames captured by the scene cameras 2001 before the frames are compressed 2003 and transmitted to the base station 2060 over the wireless connection 2080. The base station 2060 may receive the compressed scene camera warp space frames via the wireless connection 2080, decompress 2061 the frames, and write the frame data to a frame buffer 2062.

Head pose cameras 2004 (e.g., IR or RGB cameras) capture images that may be used provide information about the position, orientation, and/or motion of the user and/or the user's head in the environment. The head pose images may be passed to a head pose prediction 2014 process, for example executing on a SOC of the device 2000. The head pose prediction 2014 process may also obtain data from an inertial-measurement unit (IMU) 2012 of the device 2000. The head pose prediction 2014 process may generate position/prediction data based on the head pose images and IMU data and send the position/prediction data to a world-anchored content processing 2066 component of the base station 2060 over the wireless connection 2080. In addition, the head pose images may be sent to the base application 2063 of the base station 2060 over the wireless connection 2080. In some embodiments, the head pose images may be compressed by the device 2000 before they are transmitted to the base station 2060.

Depth sensors 2006 may capture depth or range information (e.g., IR images) for objects and surfaces in the user's environment. The depth images may be sent to a depth processing 2064 component of the base station 2060 over the wireless connection 2080. In some embodiments, the depth images may be compressed by the device 2000 before they are transmitted to the base station 2060.

Tracking sensors 2008 may capture information (e.g., IR images) about the user, for example gaze tracking information and gesture information. The user tracking images may be sent to the base station 2060 over the wireless connection 2080. In some embodiments, the user tracking images may be compressed by the device 2000 before they are transmitted to the base station 2060. At least some of the user tracking images may be sent to the base application 2063 for processing and use in rendering virtual content for the virtual view. Gaze tracking images may also be provided to a foveation process of the base station 2060.

Base application 2063 reads scene camera frame data from frame buffer 2062. Base application 2063 also receives and analyzes head pose images from head pose cameras and tracking images from tracking sensors 2008 via the wireless connection 2080. Base application 2063 may generate world-anchored and head-anchored content for the scene based at least in part on information generated by the analysis of the head pose images and tracking images. The world-anchored content may be passed to a world-anchored content processing 2066 pipeline, for example implemented by a GPU of the base station 2060. The head-anchored content may be passed to a head-anchored content processing 2068 pipeline, for example implemented by a GPU of the base station 2060. Outputs (e.g., rendered frames) of the world-anchored content processing 2066 pipeline and the head-anchored content processing 2068 pipeline may be passed to a composite/alpha mask 2070 process, for example implemented by a GPU of the base station 2060. The composite/alpha mask 2070 process may composite the frames received from pipelines 2066 and 2068, and pass the composited frames to an encoding 2072 pipeline, for example implemented by a SOC of the base station 2060.

In the encoding 2072 pipeline, a foveation component may perform foveated rendering on the composited frames as illustrated in FIGS. 7 and 8 to reduce the resolution of the rendered frames before compressing and transmitting the frames over the wireless connection 2080. In the foveated rendering method, gaze tracking information received by the base station 2060 from the gaze tracking cameras of the device 2000 may be used to identify the direction in which the user is currently looking (referred to as the gaze direction). A foveated region may be estimated from the determined gaze direction, and a filter (e.g., a band pass filter) may be applied to the peripheral region of the frame that lies outside the foveated region to reduce resolution in the peripheral region while retaining higher resolution in the foveated region. The foveated frames may then be passed to a compression component of the encoding 2072 pipeline that compresses the frames according to a video encoding protocol (e.g., High Efficiency Video Coding (HEVC), also known as H.265, or MPEG-4 Part 10, Advanced Video Coding (MPEG-4 AVC), also referred to as H.264, etc.). The compressed frames are then transmitted to the device 2000 over the wireless connection 2080.

At the device 2000, the compressed frames received from the base station 2060 are passed to a current frame decoding pipeline 2030, for example implemented by a SOC of the device 200, and are also written to a previous frame buffer 2036. Decoding pipeline 2030 decompresses or decodes the compressed frames, and performs expansion/upscale of the frames. In parallel with the processing of the current frame in the decoding pipeline 2030, the previous frame is read from the previous frame buffer 2036 and processed (decoding, expansion/upscale, and rotation) by a previous frame decoding/rotation pipeline 2038, for example implemented on a SOC of the device 2000. At 2040, the current frame output of the current frame decoding pipeline 2030 may be checked. If the current frame is good, then the current frame is selected for display. If the current frame is determined to be missing or incomplete, the previous frame output by pipeline 2030, which was rotated to match predicted motion of the user, may be selected in place of the missing or incomplete current frame.

In some embodiments, the device 2000 may be configured to function as a stand-alone device as a fallback position if the wireless connection 2080 with the base station 2060 is lost and thus frames are not received from the base station 2060. This may, for example, be done for safety reasons so that the user can still view the real environment that they are in even if the base station 2080 is unavailable. Upon detecting that the wireless connection 2080 has been lost, frames captured by the scene cameras 2001 may be routed to a direct-to-display processing pipeline 2050 to be rendered for display. Device 2000 may include a software application 2052, configured to execute on at least one processor (e.g., a CPU) of the device 2000 to generate content based at least in part on sensor inputs from the device 2000 to be displayed in a 3D virtual view to the user by the device 2000. Application 2052 may execute to render virtual content to be composited 2042 with the rendered frames and displayed in the virtual view, for example a message informing the user that the wireless connection 2080 has been lost.

Rendered and processed frames (which may be either current frames received from the base station 2060 and processed by the current frame decoding pipeline 2030, previous frames received from the base station 2060 that are read from buffer 2036 and processed by the previous frame decoding/rotation 2038 pipeline, or direct-to-display frames processed by direct-to-display processing pipeline 2050 and possibly composited with content generated by application 2052) are passed to a display pipeline 2044 that further processes the frames for display on a display screen according to the display format.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a first device configured to:
 receive frames captured by a second device, wherein the received frames have a first resolution;
 render frames based, at least in part, on transmitted information about a user of the second device and an environment of the second device, wherein the rendered frames, or portions of the rendered frames, are generated based on the received frames and have a second resolution; and
 provide compressed versions of the rendered frames, or the portions of the rendered frames, to the second device; and
the second device, wherein the second device comprises:
 one or more cameras configured to capture captured frames that are received by the first device as the received frames, wherein the captured frames include views of the second device's environment;
 one or more sensors configured to capture data about the user and the second device's environment; and
 one or more processors configured to:
  receive the data, via the one or more sensors, about the user and the second device's environment;
  transmit the captured frames to the first device;
  transmit information about the user of the second device and the second device's environment to the first device, wherein the transmitted information is generated, based, at least in part, on the received data about the user and the second device's environment;
  receive the compressed versions of the rendered frames, or of the portions of the rendered frames, from the first device;
  decompress the compressed versions of the rendered frames, or the portions of the rendered frames; and
  generate a display view based, at least in part, on the decompressed rendered frames or the decompressed portions of the rendered frames.

2. The system of claim 1, wherein:
the one or more sensors of the second device comprise a gaze tracking camera configured to capture images of the user's eyes; and
the one or more processors of the second device are further configured to transmit the captured images to the first device.

3. The system of claim 2, wherein:
to render the frames based, at least in part, on the transmitted information, the first device is further configured to:
 determine a foveated region and a peripheral region within a given one of the received frames based, at least in part, on the transmitted images captured via the gaze tracking camera; and
 reduce a resolution of the peripheral region to the second resolution; and
to provide the compressed versions of the rendered frames, or the portions of the rendered frames, the first device is further configured to:
 provide compressed versions of the foveated region, having the first resolution, and of the peripheral region, having the second resolution.

4. The system of claim 3, wherein, to provide the compressed versions of the foveated region and of the peripheral region, the first device is further configured to:
provide the compressed version of the foveated region at a first frame rate; and
provide the compressed version of the peripheral region at a second frame rate, wherein the second frame rate is lower than the first frame rate.

5. The system of claim 1, wherein:
the second device further comprises an inertial-measurement unit (IMU);
the one or more sensors of the second device comprise one or more head pose cameras configured to track the user's position and motion in the second device's environment;
the one or more processors of the second device are further configured to:
 determine a position of the user's head and predict motion of the user's head based on images captured by one or more head pose cameras, wherein the images are augmented with information received from the IMU; and
 transmit information of the determined head position and of the head motion prediction to the first device; and
the first device is further configured to render the frames based, at least in part, on the transmitted head position information and on the head motion prediction information.

6. The system of claim 5, wherein the first device is further configured to:
monitor motion of the user's head based, at least in part, on the transmitted head position and head motion prediction information; and
responsive to detecting that the user's head is not in rapid motion, provide the compressed versions of the rendered frames, or the portions of the rendered frames, at a lower frame rate with respect to previously provided compressed versions of previously rendered frames.

7. The system of claim 5, wherein the first device is further configured to:
monitor motion of the user's head based, at least in part, on the transmitted head position and head motion prediction information; and
responsive to detecting that the user's head is in rapid motion, provide the compressed versions of the rendered frames, or the portions of the rendered frames, at an increased frame rate with respect to previously provided compressed versions of previously rendered frames.

8. The system of claim 1, wherein the first device is further configured to:
monitor bandwidth usage for a transmission connection between the first and second devices; and
responsive to detecting that the bandwidth usage is above a given bandwidth threshold,
dynamically adjust a rate of said rendering the frames such that the rendered frames, or the portions of the rendered frames, have the second resolution, wherein the second resolution is lower with respect to the first resolution.

9. A device, comprising:
receive frames captured by another device, wherein the received frames have a first resolution;
render frames, wherein:
the rendered frames, or portions of the rendered frames, have a second resolution that has been adjusted relative to the first resolution based, at least in part, on transmitted information about a user of the another device and an environment of the another device; and
the rendered frames, or portions of the rendered frames, are generated based on the received frames; and
provide compressed versions of the rendered frames, or the portions of the rendered frames, to the another device.

10. The device of claim 9, wherein:
the transmitted information about the user of the other device and the environment of the other device comprises images captured via a gaze tracking camera of the other device;
to render the frames, the device is further configured to:
determine a foveated region and a peripheral region within a given one of the received frames based, at least in part, on the transmitted images captured via the gaze tracking camera; and
reduce a resolution of the peripheral region to the second resolution; and
to provide the compressed versions of the rendered frames, or the portions of the rendered frames, the device is further configured to:
provide compressed versions of the foveated region, having the first resolution, and of the peripheral region, having the second resolution.

11. The device of claim 10, wherein, to provide the compressed versions of the foveated region and of the peripheral region, the device is further configured to:
provide the compressed version of the foveated region at a first frame rate; and
provide the compressed version of the peripheral region at a second frame rate, wherein the second frame rate is lower than the first frame rate.

12. The device of claim 9, wherein:
the transmitted information about the user of the other device and the environment of the other device comprises head position information about the user's head and head motion prediction information of the user's head; and
the device is further configured to:
monitor motion of the user's head based, at least in part, on the transmitted head position and head motion prediction information; and
responsive to detecting that the user's head is not in rapid motion, provide the compressed versions of the rendered frames, or the portions of the rendered frames, at a lower frame rate with respect to previously provided compressed versions of previously rendered frames.

13. The device of claim 9, wherein:
the transmitted information about the user of the other device and the environment of the other device comprises head position information about the user's head and head motion prediction information of the user's head; and
the device is further configured to:
monitor motion of the user's head based, at least in part, on the transmitted head position and head motion prediction information; and
responsive to detecting that the user's head is in rapid motion, provide the compressed versions of the rendered frames, or the portions of the rendered frames, at an increased frame rate with respect to previously provided compressed versions of previously rendered frames.

14. The device of claim 9, wherein the device is further configured to:
monitor bandwidth usage for a transmission connection between the device and the other device; and
responsive to detecting that the bandwidth usage is above a given bandwidth threshold,
dynamically adjust a rate of said rendering the frames such that the rendered frames, or the portions of the rendered frames, have the second resolution, wherein the second resolution is lower with respect to the first resolution.

15. A device, comprising:
one or more cameras configured to capture frames, wherein the frames include views of an environment of the device; one or more sensors configured to capture data about the user of the device and the device's environment; and
one or more processors configured to:
receive the data, via the one or more sensors, about the user and the device's environment;
transmit the captured frames, having a first resolution, to another device;
transmit information about the user of the device and the device's environment to the other device, wherein the transmitted information is generated, based, at least in part, on the received data about the user and the device's environment;
receive compressed versions of rendered frames, or of portions of the rendered frames, from the other device, wherein the rendered frames or the portions of the rendered frames have a second resolution;
decompress the compressed versions of the rendered frames, or the portions of the rendered frames; and
generate a display view based, at least in part, on the decompressed rendered frames or the decompressed portions of the rendered frames.

16. The device of claim 15, wherein:
the one or more sensors comprise a gaze tracking camera configured to capture images of the user's eyes;
the one or more processors are further configured to transmit the captured images of the user's eyes to the other device; and
the received compressed versions of the rendered frames, or of the portions of the rendered frames comprise:
a foveated region of a given frame of the received compressed versions of the rendered frames, wherein the foveated region has the first resolution;

a peripheral region of the given frame, wherein the peripheral region of the given frame has the second resolution, wherein the foveated region and the peripheral region of the given frame have been determined based, at least in part, on the transmitted captured images of the user's eyes.

17. The device of claim 16, wherein, to receive the compressed versions of the rendered frames, or of the portions of the rendered frames, from the other device, the one or more processors are further configured to:

receive a compressed version of the foveated region of the given frame at a first frame rate; and receive a compressed version of the peripheral region at a second frame rate, wherein the second frame rate is lower than the first frame rate.

18. The device of claim 15, wherein:

the device further comprises an inertial-measurement unit (IMU);

the one or more sensors comprise one or more head pose cameras configured to track the user's position and motion in the device's environment; and the one or more processors are further configured to:

determine a position of the user's head and predict motion of the user's head based on images captured by one or more head pose cameras, wherein the images are augmented with information received from the IMU; and transmit information of the determined head position and of the head motion prediction to the other device.

19. The device of claim 18, wherein:

the determined head motion prediction information comprises a prediction that the user's head is not in rapid motion; and the one or more processors are further configured to:

receive the compressed versions of the rendered frames, or of the portions of the rendered frames, from the other device at a lower frame rate with respect to previously received compressed versions of previously transmitted frames, wherein the lower frame rate is based, at least in part, on the transmitted prediction that the user's head is not in rapid motion.

20. The device of claim 18, wherein:

the determined head motion prediction information comprises a prediction that the user's head is in rapid motion; and the one or more processors are further configured to:

receive the compressed versions of the rendered frames, or of the portions of the rendered frames, from the other device at a higher frame rate with respect to previously received compressed versions of previously transmitted frames, wherein the higher frame rate is based, at least in part, on the transmitted prediction that the user's head is in rapid motion.

* * * * *